US006438592B1

(12) United States Patent
Killian

(10) Patent No.: US 6,438,592 B1
(45) Date of Patent: Aug. 20, 2002

(54) SYSTEMS FOR MONITORING AND IMPROVING PERFORMANCE ON THE WORLD WIDE WEB

(76) Inventor: Michael G. Killian, 34B Lee St., Jamaica Plain, MA (US) 02130

( * ) Notice: Subject to any disclaimer, the term of this patent is extended or adjusted under 35 U.S.C. 154(b) by 0 days.

(21) Appl. No.: 09/030,596

(22) Filed: Feb. 25, 1998

(51) Int. Cl.[7] .............................................. G06F 15/173

(52) U.S. Cl. ......................... 709/224; 709/203; 709/217

(58) Field of Search ................................ 709/201, 203, 709/216, 217, 218, 219, 226, 228, 224

(56) References Cited

U.S. PATENT DOCUMENTS

| | | | | |
|---|---|---|---|---|
| 5,727,159 A | * | 3/1998 | Kikinis ........................ | 709/246 |
| 5,774,660 A | * | 6/1998 | Brendel et al. ............. | 709/203 |
| 5,896,502 A | * | 4/1999 | Shieh et al. ................ | 709/224 |
| 5,898,839 A | * | 4/1999 | Berteau ....................... | 709/227 |
| 5,913,041 A | * | 6/1999 | Ramanathan et al. ....... | 709/233 |
| 5,933,600 A | * | 8/1999 | Shiel et al. ................. | 709/219 |
| 6,006,260 A | * | 12/1999 | Barrick, Jr. et al. ........ | 709/224 |
| 6,049,342 A | * | 4/2000 | Nielsen et al. .............. | 345/473 |
| 6,065,059 A | * | 5/2000 | Shieh et al. ................ | 709/233 |
| 6,073,168 A | * | 6/2000 | Mighdoll et al. ........... | 709/217 |
| 6,078,917 A | * | 6/2000 | Paulsen et al. ................ | 707/6 |

OTHER PUBLICATIONS

"Inverse Network Technology", a 3 page printout of a web page from www.inversenet.com/products/benchmark.html, on a web site of Inverse Network Technology Inc., 1215 Apollo Way, Sunnyvale, CA 94086, downloaded on Nov. 4, 1997.

"Keynote Systems: Products—Software", a 6 page printout of a web page from www.keynote.com, a web site of Keynote Systems, Inc. Two west Fifth Ave., San Mateo, CA 94402, downloaded on Nov. 4, 1997.

"Keynote Systems: Sales—Prices and Quotations" a 1 page printout of a web page on two subscription plans for Keynote Perspective from www.keynote.com, a web site of Keynote Systems, Inc. Two west Fifth Ave., San Mateo, CA 94402, downloaded on Nov. 4, 1997.

"OnTime Delivery", a 3 page printout of a web page from www.timedancer.com, a web site of Timedancer Systems, downloaded on Nov. 4, 1997.

(List continued on next page.)

*Primary Examiner*—Moustafa M. Meky
(74) *Attorney, Agent, or Firm*—Edward W. Porter

(57) ABSTRACT

A Web system includes a server which receives URL requests from client computers and responds by transmitting the requested data to the clients along with performance monitoring instructions. These instructions cause the clients to send performance message back to the server indicating the time required on the client for certain acts associated with transmitted data. Often they cause a client to monitor the time required to download a composite data object, such as a Web page which include separately downloaded images, frames, or applets. They can also instruct the client to measure other times, such as the time required to download individual component objects; to execute given code, or to execute a transaction. Preferably the server includes means for automatically analyzing the performance messages it receives to detect different types of performance problems. It is also preferred that the system automatically respond differently to such different types of problems, including varying the performance monitoring instructions it sends, sending messages to clients informing them of the types and locations of problems detected, automatically sending out leaner versions of Web pages, offering clients options to deal with problems, informing the server's operator of problems, throttling certain types of URL requests, increasing the system's capacity, and varying IP spreading as a function of performance monitoring information.

39 Claims, 28 Drawing Sheets

OTHER PUBLICATIONS

"Characterizing End–to–End Performance", a 20 page printout of a web page from www.vitalsigns.com, a web site of VitalSigns Software Inc., downloaded on Nov. 4, 1997.

"VitalSigns Family of Products", a 2 page printout of a web page from www.vitalsigns.com, a web site of VitalSigns Software Inc., downloaded on Dec. 5, 1997.

"Serverwatch Site Monitoring Tools", an 15 page printout of a web page from www.serverwatch.internet.com/tools/monitor.html, a web site of Mekclermedia Corporation, downloaded on Nov. 4, 1997.

"PacketShaper 1000 Data Sheet", a 4 page printout of a web page from www.packeteer.com, a web site of Packeteer, Inc. of 10495 N. De Anza Blvd, Cupertino, CA 95014 downloaded on Feb. 24, 1998.

Affidavit of Michael G. Killian Concerning Prior Art Pursuant To 37 CFR 1.56 and 1.97, dated Feb. 24, 1998.

"Overview: Cisco LocalDirector 416 and 430", a print out of a web page made on Jan. 12, 2001 from www.cisco.com/warp/public– /cc/pd/cxsr/400/prodlit/1o412_ov.htm (The inventor would like to draw the examiner's attention to the section entitled "Server Connection Management").

* cited by examiner

```
<HTML>
<HEAD>
<TITLE>Welcome to Company X</TITLE>
<SCRIPT LANGUAGE="JavaScript">
...
function startTimer(eventType, startedObject){...}~168
function endTimer(eventType, endedObject, thresholdTime){...}~170
function checkForNoReponse(){...}~172
...
</SCRIPT>
</HEAD>
<BODY
onLoad="set timerWindowCookie active for server's domain with an BrowserID;"
onUnload="erase timerWindowCookie for server's domain;"
>
<SCRIPT>
...
startTimer(pageRequest, requestedURL)~164
window.open(requestedURL, windowname, windowfeatures)~162
-loop until timerObjectLoaded is True~200
    -if time since last call to checkForNoResponse() is over a threshold call that
    function~202
...
</SCRIPT>
<BR><H1>Welcome to Company X's Web Site~166
...
</BODY>
</HTML>
```

FIG. 3

```
function StartTimer~168(eventType, startedObject){
    -if startedObject's URL did not come from timerWindowPage's serve,
    return~174
    -set timerStartedObject = startedObject~176
    -set timerStartTime = the current time~178
    -set timerObjectLoaded = False~180
    ...
}
```

FIG. 4

```
function EndTimer~170(eventType, endedObject, thresholdTime){
    -if endedObject's URL did not come from timerWindowPage's server,
    return~182
    -if eventType is pageUnLoad~184
        -erase document's corresponding pageCookie~185
        - if timerObjectLoaded is true, return~187
    -set timeDifference = the current time minus timeStartTime~186
    -if timeDifference is greater than thresholdTime~188
        -send performance message form to spreader computer with~190
            -browserID = browser's browserID
            -eventType= eventType
            -startedObject= timerStartedObject
            -endedObject= endedObject
            -threshholdTime=tresholdTime
            -timeDifference=timeDifference
    -if eventType is pageOnload, formConfirm, or codeEnd~192
    -set timerObjectLoaded = True~194
    ...
}
```

FIG. 5

```
function CheckForNoReponse~173(){
    -if difference between timerStartTime and current time is over a
    noResponseThresholdTime~196
        -send performance message form to spreader computer with~198
            -browserID = browser's browserID
            -eventType=pageTimeout
            -startedObject=timerStartedObject
            -endedObject=Null
            -threshholdTime=noResponseThresholdTime
            -timeDifference=currentTime - timerStartTime
}
```

<HTML>
<HEAD>
<TITLE>Company X's Products</TITLE>
<SCRIPT LANGUAGE="JavaScript">
...
//start of Std. Performance Monitoring Code
function startTimer(eventType, startedObject){...}~206
function endTimer(eventType, endedObject,
    theshholdTime){...}~208
-for each msgCookie if any found~210
        -generate an alert, conform, or prompt dialog box with script
         corresponding content of msgCookie~212
        -erase the msgCookie~214
//end of Std. Performance Monitoring Code
...
</SCRIPT>
</HEAD>
<BODY
onLoad="endTimer(pageOnload, page'sURL);"~260
onUnload="endTimer(pageUnload, page'sURL);"~262
>
<H1>Company X's Product Categories
<P>
<IMG SRC="../radios.gif"
onLoad="endTimer(componentOnload, "../radios.gif");"~237
>
<A HREF="../radios.html"~222
onClick="startTimer(pageRequest, "../radios.html");"~223
>Radios</A> </P>~220
<P>
<IMG SRC="../tvs.gif"
onLoad="endTimer(componentOnload, "../tvs.gif");"~237
>
<A HREF="../tvs.html"
onClick="startTimer(pageRequest, "../tvs.html");"~223
>Televisions</A> </P>
...
</BODY>
</HTML>
```

- 205 (brackets enclosing performance monitoring code block)
- 204 (radios.gif block)
- 216A (radios.html block)
- 204 (tvs.gif block)
- 216 (tvs.html block)

FIG. 7

```
function startTimer~206(eventType, startedObject){
        -if timerWindow is open~226
                -if startTimer's document is a page~228
                        -call parent.creator.startTimer(eventType, startedObject)~230
                -else~232
                        -call parent.startTimer(eventType, startedObject)~234
}
```

FIG. 8

```
function endTimer~208(eventType, endedObject, theshholdTime){
        -if timerWindow is open~242
                -if endTimer's document is a page~243
                        -if a pageCookie is found for current document~244
                                -if pageCookie says not to monitor eventType return~246
                                -if thresholdTime is Null~248
                                        -if pageCookie specifies a thresholdTime for the
                                        eventType~250
                                                -set thresholdTime equal to it~252
                                        -else set threshholdTime = 0~254
                                -call parent.creator.endTimer(eventType, endedObject,
                                thresholdTime)~256
                -else~257
                        -call parent.endTimer(eventType, endedObject,
                        thresholdTime)~258
}
```

FIG. 9

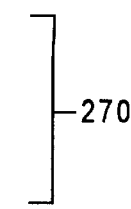

```
<HTML>
<HEAD>
<TITLE>Company X's TVs</TITLE>
<SCRIPT LANGUAGE="JavaScript">
-Std. Performance Monitoring Code~205
...
</SCRIPT>
</HEAD>
<FRAMESET ROWS="80%,*" onLoad="endTimer(pageOnload,~274
   page'sURL);">
        <FRAME SRC="../TVOptions.html">~272
        <FRAME SRC="../feedbackOnWebSite..html">~272
</FRAMESET>
</HTML>
```

```
<HTML>
<HEAD>
<TITLE>Feedback On Website</TITLE>
<SCRIPT LANGUAGE="JavaScript">
```
-Std. Performance Monitoring Code~205
```
...
</script>
</HEAD>
<BODY onLoad="endTimer(componentOnload,
```
document'sURL);">~260B
```
<P>
<IMG SRC="../pleasedFace.gif"
     onLoad="endTimer(componentOnload,
     "../pleasedFace.gif");"~237
>
Are you
<A HREF="../wantMore.html"
     onClick="startTimer(pageRequest,
     "../pleasedWithWebSite.html");"~223
>pleased</A>
 with this web site the way it is?      or
<IMG SRC="../thinkingFace.gif"
     onLoad="endTimer(componentOnload,
     "../thinkingFace.gif");"~237
>
do you have ideas for how to
<A HREF="../getIdeasForImprovement.html"
     onClick="startTimer("../getIdeasForImprovement.html",
     Page);"~223
>improve it</A>? </P>
...
</BODY>
</HTML>
```

```
<HTML>
<HEAD>
<TITLE>Your Ideas For Improvement</TITLE>
<SCRIPT LANGUAGE="JavaScript">
```
-Std. Performance Monitoring Code~205

. . .

startTimer(codeStart, page'sURL/"RadioCodePoint1")~272

-portion of code~276 endTimer(codeEnd, page'sURL/"RadioCodePoint2")~274

. . .
```
</script>
</HEAD>
<BODY>
```
. . .
```
</BODY>
</HTML>
```

◄——118D

```
<HTML>
<HEAD>
<TITLE>Purchase Form</TITLE>
<SCRIPT LANGUAGE="JavaScript">
```
-Std. Performance Monitoring Code~205
```
...
</SCRIPT>
</HEAD>
<BODY>
...
<H1>Purchase Form
<P> Fill in each item in the form below (the second Street
Address line is optional) to purchase an item.  Once all the
items have been correctly filled in press the submit button.
Wait for a confirmation page to confirm whether or not the
transaction was completed
<FORM METHOD=POST ACTION="../cgi_bin/purchaseform.pl"~280
   onSubmit="startTimer(formSubmit,
   "../cgi_bin/purchaseform.pl");">~278
<BR> Item Number...................<INPUT TYPE="text"
Name="itemNumber">
<BR> Quantity......................<INPUT TYPE="text"
Name="quantity">
<BR> First Name....................<INPUT TYPE="text"
Name="firstName">
<BR> Middle Initial(s).............<INPUT TYPE="text"
Name="midInitials">
<BR> Last Name.....................<INPUT TYPE="text"
Name="LastName">
...
</FORM>
...
</BODY>
</HTML>
```

(form block braced as 216)

FIG. 13

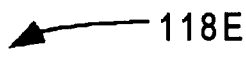

```
<HTML>
<HEAD>
<TITLE>Purchase Confirmation</TITLE>
<SCRIPT LANGUAGE="JavaScript">
```
Std. Performance Monitoring Code~205
```
...
</SCRIPT>
</HEAD>
<BODY onLoad="endTimer(formConfirm,
"../cgi_bin/purchaseform.pl");">~280
<H1> This confirms the following purchase
<BR>     Item Number: Q1345, a Roxy C332 Radio
<BR>     Quantity: 1
<BR>
<BR>     First Name: John
<BR>     Middle Initial(s): M.L.
<BR>     Last Name: Smith
...
</BODY>
</HTML>
```

FIG. 14

-clientSpaceTree~152
    <u>-system node~284--containing</u>
        -system node identifier~285
        -probMsg/msgSent data~310
        -increasedOnloadTime data~312
        ...
        <u>-organization btree~286--containing for each node~287</u>
            -organization tag~314
            -probMsg/msgSent data~310
            -increasedOnloadTime data~312
            -subtree probMsg/msgSent data~310A
            ...
            <u>-namedEntity btree~300--containing for each node~302</u>
                -networkEntity tag~316
                -probMsg/msgSent data~310
                -increasedOnloadTime data~312
                ...
                <u>-browserID btree~304--containing for each node~306</u>
                    -BrowserID~318
                    -probMsg/msgSent data~310
                    -increasedOnloadTime data~312
                    -backendContextServer~320
                    -lastProblemMsgTime~322
                    -purchaseHistory data~324
                    ...
                    -componentMonitoringBlock~326(optional)
                        ...
                        -pageURL~328
                        -componentFIFO~330
                            -list of requested
                              componentURLs~332

FIG. 17

-serverSpaceTree~154
    -system node~340--containing
        system node identifier~341
        -statisticsSet~354
            -probMsg/msgSent data~310B
            -probMsg/formRequests data~356
            -requestsPending data~358
            -requestsAnswered data~360
            -bytesSent data~362
            -responseTime data~364
            -increasedOnloadTime data~312A
            ...
    -backendServer btree~342--containing for each node~344
        -backendServerName~386
        -statisticsSet~354
            ...
        -hardDisk btree~347--containing for each node~348
            -hardDiskPathName~370
            -statisticsSet~354
                ...
            -file btree~351--containing for each node~352
                -filePathName~372
                -statisticsSet~354
                    ...
                -openRequestList~381
374 {
                -onloadTimeDistribution (for pages&components)~377
                -formTimeDistributions (for form scripts)~376
                -unloadTimeDistribution (for pages)~378
                -codeTimeDistributions (for documents)~380
                -monitoringInstructions~384
                    -monitorEventType data--~384
                      for each eventType
                          thresholdTime~388
                          ifMonitored~386
                -updateTimeDistributions~382

FIG. 19

-mainSpreaderLoop~400
    -if receive
        -URL request~401
            -call handleURLRequest for the request~402
        -performance message~403
            -call handlePerformanceMsg for the message~404
        -versionTypeMsg~405
            -place corresponding versionType in client's browserID node~406
        -request for analysis software~407
            -send such software to the requesting client~408
        -request for charting program from authorized client~409
            -call chartingProgram for the requesting client~410
        -requestAnsweredMsg~412
            -call handleRequestAnsweredMsg for the message~414
        -...
    -if time since last call to determineIfServerHasProblem exceeds threshold~413
        -call determineIfServerHasProblem~415
    -if time since last call to distributionUpdate exceeds threshold~416
        -call distributionUpdate~417
    -...

FIG. 20

-handleURLRequest(URLrequest)~417
    -place request in msgHistory with time received~418
    -if request does not contain a browserIDCookie~419
        -generate new browserID and make node for it in clientSpaceTree~420
    -if request does not contain a timerWindowCookie with a browserID matching that of request's browserIDCookie~421
        -generate and send to client a timerWindow which requests the requested URL, with a permanent browserIDCookie valid for server's domain containing the new browserID~422
        -return~423
    -if URL is for a page~224
        -call sendMsgDownClientSpaceTree for message~225
        -set server script to include a pageCookie in response to client~431
        -if componentMonitoring is on, if probMsg/msgSent count in page's file node indicates a problem, and if no network problem is associated with client's nodes in the clientSpaceTree~426
            -create a componentMonitoringBlock in browser's node in clientSpaceTree~427
            -set server script to include componentOnload monitoring with zero thresholdTime in pageCookie~428
        -else~429
            -delete requesting browser's componentMonitoring-Block, if any, in clientSpaceTree~430
        -if page's entry has monitoringInstructions in path down serverSpaceTree~432
            -set server script to include monitoringInstructions, including threshold times, most specific to page in the pageCookie~434
    -else if URL is for a component~498
        -if requesting browser has a componentMonitoringBlock in clientSpaceTree~500
            -if block's componentFIFO is not empty~502
                -place URL at end of componentFIFO~504
                -return~508
    -call selectAndRequestAppropriateBackendResponse for requestedURL~510

FIG. 21

-sendMsgDownClientSpaceTree(msg)~436
    -send message down the clientSpaceTree, and at each node it reaches~437
        -if node is an organization node~438
            -increment subtree probMsg/msgSent data~440
        -if node corresponds to client from which message came~442
            -increment node's probMsg/msgSent data with message~444
            -if message is URL request and node contains problemNode indication, call prepareMsgCookieForResponse for the node~446
        -if no problemNode is entered for ancestor of node in clientSpaceTree~450
            -if probMsg/msgSent data confirms problem~452
                -place a problemNode entry on the node~454
            -else if node is marked as a problemNode~456
                -remove node's problemNode entry~458
                -remove any versionType=lightDuringProblem entry from node or any child nodes associated with its client address space~460

FIG. 22

- prepareMsgCookieForResponse(URLRequest, node)~462
    - if the lastProblemMsgTime in the message's browserID node indicates no problem message has been sent to client in last 5 minutes~464
        - set browser's lastProblemMsgTime to current time~466
        - if node is root of clientSpaceTree~468
            - set a script to send a msgCookie with response to the current URLrequest which causes client's browser to display an alert dialog box which states the server appears to be having a problem, states the estimated increase in average download time based the root node's increasedOnloadTime, and that during the problem the server will send out light version of web pages~470
        - else if node is not a browserID node~472
            - set a script to send a msgCookie with response to the current URLrequest which causes client's browser to display a confirm dialog box which states the node (identified by domain name) appears to be having a problem, states the estimated increase in average download time based the node's increasedOnloadTime, and has a button with associated script which offers the user an option of sending versionType=light-DuringProblem message causing client to be sent light versions of pages during the problem~474
        - else if node is a browserID node~476
            - set a script to send a msgCookie with response to the curretn URLrequest which causes client's browser to display a confirm dialog box which states the client computer appears to be having a problem, states the estimated increase in average download time based the browserID node's increasedOnloadTime, and has a button with associated script which offers the user an option of sending versionType=light-DuringProblem message causing client to be sent light versions of pages during the problem~478
            - set a script to send a second msgCookie with the response which causes client's browser to display a second confirm dialog box after the first which has a button with associated script which offers the user an option of being sent software which will attempt to determine to cause of the client's problem~480

FIG. 23

-selectAndRequestAppropriateBackendResponse(URLRequeste)~512
    -if any combination of the browser's associated nodes in clientSpaceTree include both a problemNode and a versionType=lightDuringProblem~513
        -set currentVersionType=light~514
    -if URLVersionList has an entry for requestedURL specifying a URL of currentVersionType~~516
        -then set currentURL equal to the URL of that versionType~518
    -else~520
        -set currentURL equal to requestedURL~522
    -use serverSpaceTree to find all copyURLs on backend servers having a below-disk path corresponding to currentURL~524
    -if the currentURL requires backend server context~525
        -limit copyURLs to those from backendContextServer listed in current browser's entry in clientSpaceTree~526
    -select that one of the remaining copyURLs whose hard drive has the lowest probMsg/msgSent in the severSpaceTree~528
    -if currentURL requires browser context, and if browser's backendContextServer value has not yet been set ~529
        -set it to the server of selected copyURL~~530
    -generate URLrequest for the selected copyURL with original client's source address and with any cookies set by the spreader's scripts~531
    -send request down serverSpaceTree, and for each node~532
        -increment appropriate msgSent or formSent counts~533
        -increment requestsPending count~534
        -if node is file node~536
            -enter time, client address and browser ID in OpenRequestList~538

FIG. 24

-backendCode~540
    -...
    -if receive a URL request from spreader computer~541
        -sent out requested URL with spreader's IP address as source address for message and with copies of any cookies contained in message from spreader~542
        -when data object is completely sent send a corresponding requestAnsweredMsg to spreader~543
    -...

FIG. 25

-handlePerformanceMsg(performanceMsg)~544
    -label message with time received and place msgHistory~546
    -if messages is for a pageOnload or pageTimout call handlePerformance-
MsgForPage~548
    -else if message is for a componentOnload call handlePerformanceMsg-
ForComponent~550
    -else if message is for a formConfirm~552
        -if message's timeDifference exceeds a threshold~553
            -send it down serverSpaceTree, incrementing probMsg counts
in probMsg/formRequests data structures in corresponding
nodes~554
        -if updateTimeDistributions data structure in message's file node
indicates file's formTimeDistribution is to be updated and there is no
problem indicated by probMsg/msgSent values in any corresponding
nodes in serverSpaceTree~556
            -use message's timeDifference to update file's
formTimeDistribution~558
    -else if message if for a pageUnload~560
        -use it to update UnloadTimeDistribution for message's associated
page~562

FIG. 26

-handlePerformanceMsgForPage(performanceMsg)~564
    -if its onload time is over a threshold~566
        -call sendMsgDownClientSpaceTree for message~568
        -send message down serverSpaceTree, and at each corresponding
node~570
            -increment probMsg values in node's probMsg/msgSent data
structure~572
    if updateTimeDistributions data structure in message's file node indicates
the page's onloadTimeDistribution is to be updated and there is no problem
indicated by probMsg/msgSent values in any corresponding nodes in
serverSpaceTree~574
        -use message's onload timeDifference to update pages's onloadTime-
Distribution~576
    -find difference between onload time for the message and the average of
page's onloadTimeDistribution and use it to update increasedOnloadTime
values in related nodes in both clientSpaceTree and serverSpaceTree~578

FIG. 27

-handlePerformanceMsgForComponent(performanceMsg)~580
    -derive component's individual download time by subtracting from it's componentOnload timeDifference the componentOnload timeDifference of the previous component downloaded for same page~582
       --if message's individual download time exceeds a threshold~584
           -send it down serverSpaceTree, incrementing probMsg values in probMsg/msgSent data structures in corresponding nodes~586
    -if message's browser has a componentMonitoringBlock~588
       -remove component's URL from block's componentFIFO~590
       -if there is another componentURL in componentFIFO~592
           -call selectAndRequestAppropriateBackendReponse for that next componentURL~594
=if updateTimeDistributions data structure in message's file node indicates the component's onloadTimeDistribution is to be updated and there is no problem indicated by probMsg/msgSent values in any corresponding nodes in serverSpaceTree~596
       -use message's onload time to update component's onloadTimeDistribution~598

FIG. 28

-chartProgram~600
    -...
    -let user pick tree node for which data is to be displayed~602
    -let user pick values to be displayed for each such node~604
    -let user pick type of presentation~606
    -generate an image continaing a representation of values for each selected node~608
    -send image to user~610
    -...

FIG. 29

-handleRequestAnsweredMsg~614
    -send requestAnsweredMsg down serverSpaceTree, and for each corresponding node~616
        -increment node's requestsAnswered count~618
        -update node's bytesSent values~620
        -decrement node's requestsPending count~622
        -if node is file node~624
            -calculate server response time for message from difference between current time and time of the message's matching request in the openRequestList~626
            -delete the message's matching request from openRequestList~627
            -update responseTime values of corresponding nodes in serverSpaceTree with server response time calculated for message~628

FIG. 30

-determineIfServerHasProblem()~630
    -call determineIfThereIsGeneralServerProblem~632
    -call determineIfThereIsLocalizedServerProblem~631

FIG. 31

-determineIfThereIsGeneralServerProblem()~636
    -attempt to find the set of the eight highest organization nodes in the clientSpaceTree which have over a specified threshold number of subTree msgSent counts within a given recent time frame and which most evenly divide such msgSent counts~640
    -if such a set of organization nodes is found and if each of them has above a threshold subTree probMsg/msgSent ratio for the given time frame~642
        -place a ProblemNode indication in root of clientSpaceTree~644
        -place a versionType=LightDuringProblem in root of clientSpaceTree~646
        -send an e-mail and pager message to the human operators of the server stating~648
            -that a general performance problem has been detected, listing the probMsg/msgSent ratio and increasedOnLoadTime of root node of the clientSpaceTree, and~650
            -if requestsAnswered rate for all the backend servers is not at a high level, that problem may be a hardware problem, listing such rates for each backend server~652
    -if increasedOnloadTime of root of clientSpaceTree is more than a threshhold amount after versionType has been set to lightDuringProblem for a threshhold length of time~654
        -if throttleOnGeneralProblem is set~656
            -cause spreader to throttle responses to low priority requests~658
        -else if increaseBackendServersOnGeneralProblem is set~660
            -if system can rent use of an extra host site for less than a threshold amount~662
                -copy files to one or more extra hosts, and enter their addresses in IP server, and start spreading requests to new servers~664
        -else if increaseThrottleOnGeneralProblem is set~666
            -if can purchase extra throttle capacity for less than threshold price do so~668
  -else~670
    -clear ProblemNode from root of clientSpaceTree and all versionType=LightDuringProblem beneath it~672

FIG. 32

-determineIfThereIsLocalizedServerProblem()~638
　　-separately calculate the average for each performance statistic across the backend server level and then across the hard disk level of the serverSpaceTree~680
　　-for each of the backend server or hard disk node of the serverSpaceTree ~681
　　　　-for each performance statistic listed for the node~682
　　　　　　-if sufficient data indicates that statistic is substantially worse than the average for that statistic calculated for the corresponding level in the serverSpaceTree ~684
　　　　　　　　-if the statistic was not previously marked as a problemForNode~686
　　　　　　　　　　-mark the statistic as a ProblemForNode~688
　　　　　　　　　　-send a notification to the operators of the server system, specifing the node, statistic, the average value of the statistic for the level, and the value of the statistic for the node~690
　　　　　　-else if the statistic is marked as a problemForNode~692
　　　　　　　　-remove the problemForNode indication~694
　　　　　　　　-send a notification to the operators of the server system, specifying that the statistic is no longer a problem for the node~696

FIG. 33

-distributionUpdate()~700
　　-for each file node in serverSpaceTree~702
　　　　-for each timeDistribution in that file node~703
　　　　　　-if the timeDistribution is stale~704
　　　　　　　　-set the updateTimeDistribution data structure for that file node to monitor event necessary to update the stale timeDistribution~706
　　　　　　-...

FIG. 34

-clientSpaceTree~152A
    -system node~284--containing
        ...
        -organization btree~286--containing for each node~287
            -...
            -networkEntity btree~300--containing for each node~302
                -..
                -increasedOnloadTimeList~312B
                    -IncreasedOnloadTimeForBackendServer1~710
                    -IncreasedOnloadTimeForBackendServer2~710
            -...
            -browserID btree~304--containing for each node~306
                -...

FIG. 36

-selectAndRequestAppropriateBackendResponse(requestedURL)~512A
    -...
    -if URL is for a page and if do not have valid increasedOnloadTimes for each backend server for all remaining copyURLs' corresponding namedEntity node in clientSpaceTree~714
        -randomly select a copyURL whose corresponding backend server does not have a valid increasedOnloadTime~716
        -set script to set page's pageCookie's to have a zero pageOnload threshold time and to send a backendServerCookie for the page indicating the selected backend server and that the selected backend server's increasedOnloadTime is to be updated~718
    -else~720
        -select that one of the remaining copyURLs whose backend server has the lowest combination of increasedOnLoadTimes in both its networkEntity node in the clientSpaceTree and in its node in the serverSpaceTree~722
        -set script to send a backendServerCookie with the page indicating the selected backend server and that the selected backend server's increasedOnloadTime need not be updated~724
    -...

FIG. 37

-handlePerformanceMsgForPage(performanceMsg)~564A
- ...
   if updateTimeDistributions data structure in message's file node indicates the page's onloadTimeDistribution is to be updated and there is no problem indicated by probMsg/msgSent values in any corresponding nodes in serverSpaceTree~574
      -use message's onload timeDifference to update pages's onloadTime-Distribution~576
   -find difference between onload time for the message and the average of page's onloadTimeDistribution and use it to update increasedOnloadTime values in related nodes in both clientSpaceTree and serverSpaceTree, using backendServerCookies sent with performanceMsg to update appropriate increasedOnloadTime in networkEntity nodes~578A
   -else if performanceMsg contained a backendServerCoookie indicating that the server's increasedOnloadTime is to be updated~730
      -find difference between onload time for the message and the average of page's onloadTimeDistribution and use it to update the increasedOnloadTime of the backend server identified by the message's backendServerCookie in the message's networkEntity node~732

FIG. 38

SYSTEMS FOR MONITORING AND IMPROVING PERFORMANCE ON THE WORLD WIDE WEB

FIELD OF THE INVENTION

The present invention relates to a system for monitoring and improving performance of client-server hypermedia, such as, for example, the downloading of pages and page components on the World Wide Web.

BACKGROUND OF THE INVENTION

As the computer revolution advances, computer networking has become increasingly important. In recent years the number of computers which are connected to computer networks has increased rapidly. Not only are computers being connected with local networks, which might exist in a given building or group of buildings, but also with wide area networks, which commonly connect local area networks in widely separated locations, such as the different facilities of a large corporation. In fact, within the last several years it has become increasingly common for computers to be hooked up to a global network formed of a large number of sub-networks called the Internet.

An increasingly important use of networking is for distributing client-server networked hypermedia. In such a use, a server computer responds to a request from a client computer over an internetwork for a specific media objects, such as a World Wide Web page. It responds by sending the requested media object to the requesting client computer. The request message identifies the network address of the client computer which has sent it, the address of the server computer to which it is addressed and the address of the desired media object. The address of the desired media object is identified by a location specification which identifies both the address of the server computer to which the request is addressed and the address within the storage system of the server of the desired object. In the World Wide Web such an identifier is called Uniform Resource Locator, or URL.

Many requested media objects are composite objects. These contain within their data location specifications, such as URLs, which link to other, component, media objects, such as image, audio, video, or programming objects. They are automatically accessed and used in the display of their associated composite objects. For example, most World Wide Web pages include URL links to image files which are automatically requested and displayed as part of the such pages. In addition to such automatically called links, a media object, such as a World Wide Web page, can include links to media objects which are only requested if a user selects to have them called, such as by clicking a mouse on a portion of a computer screen associated with such a link.

The present invention relates to such client-server hypermedia. The World Wide Web is currently by far the most important example of such hypermedia, but in this specification and the claims when I use the word "Web" I mean not only to refer to the World Wide Web itself, as it currently exists, but also future forms of such client-server hypermedia, such as that which might exist on a second generation Internet that is currently being planned. Similarly, when I refer to URLs in the claims that follow I intend to include other location specifications which might be used in client-server hypertext media of the future.

It is common for those who distribute information and services over the Web through a server system to want to monitor the level of performance they are providing to users and, if possible, to modify the operation of the server so as to improve that performance.

In the prior art there have been multiple systems which enable operators of Web servers to chart information contained in URL requests which the server has received from client computers. This information includes such statistics as distribution of source addresses of client computers from which such requests have been received and the distribution of files which have been requested.

The prior art has also included server systems which monitor the performance of the server computer itself. For example, the prior art has includes system which can provide an indication of the degree of busyness of a server. Such systems can provide those who operate Web servers with valuable information about the number of URL requests the server is receiving and the number of messages or bytes a server is sending out at any point in time. They can also indicate the time delay between the receipt of a request for a given media object and the time that the object is sent out.

Such measurements have been used in so-called IP spreading servers. Such servers are comprised of at least one spreader computer and two or more backend servers connected by the Internet. The spreader computer distributes the work of responding to URL requests between its associated backend servers as a function of how busy each individual backend server is. In such IP spreading servers, URL links to the server are all addressed to the spreader computer. When the spreader receives such requests from a client, it selects which of its backend servers should handle the request. It then sends the URL request to the selected backend server by placing it on the Internet with the selected backend server's Internet Protocol ("IP") address as the request's destination address. The spreader varies from normal Internet Protocol by using the source IP address of client which sent the URL request to the spreader rather than the spreader's own IP address as the relayed request's source address. When the backend server receives the relayed request, it places one or more messages containing the contents of the file identified in the request's URL on the Internet. Each of these response messages is addressed to the client IP address identified by the source address in the relayed URL request received by the backend server. Like the spreader, the backend server varies from normal Internet Protocol by sending such response messages out with other than the backend server's own address as the source address. Instead, it uses the spreader computer's address as the source address for such response messages, since the client is expecting a response from the same address to which it sent the original URL request.

Unfortunately, monitoring performance on server systems does not give complete information about how long it actually takes a customer to display a given composite Web page. The display of the Web page normally only comes together at the client. The time to download a composite page includes the time required to download multiple different objects, and to my best knowledge no current servers determine which requests for Web page component are associated with which requests for Web pages. Monitoring performance on a server also fails to provide an accurate picture of the performance witnessed by clients because network delays external to the server can affect the performance observed by a client. Furthermore, when a server gets severely backed up, there often becomes a significant delay before a server can even accept receipt of a request, and there is no method for a server to measure delays which occur before it accepts receipt of a message.

To address the issue of monitoring how long it takes for Web objects to download onto client computers, the prior art has developed the technique of "mimicing". This involves using one or more client computers located at various points on the Internet which have been programmed to measure the amount of time required to download a Web page and to provide a report on such measurements. Unfortunately this technique is spotty at best, because usually the number of mimicing computers, and the number of downloads to such computers, is extremely small compared to the number of clients and downloads a large server might have. Furthermore, mimicing is only a mechanical attempt to imitate the use of the server by its human users. As a result, it often fails to accurately monitor the performance actual human users of the server see.

SUMMARY OF THE INVENTION

It is an object of the present invention to provide apparatuses and methods for improving the ability of those who operate Web servers to monitor the service they are providing to client computers.

It is another object of the present invention to provide apparatuses and methods for enabling Web servers to improve the performance they provide to client computers.

The present invention relates to a system for providing client-server hypermedia. It includes a Web server comprised of one or more computers connected to each other and to client computers by a computer network. It receives URL requests from individual client computers requesting the transmission by the server to the client computers of individual data objects, such a Web pages or images, identified by URL. Such a server responds to each URL request by transmitting information including the requested data object to the client from which the request came.

According to one aspect of the invention the information which the server transmits in response to a URL request includes performance monitoring instructions which instruct the client computer to send to the server a performance message indicating the length of time required on the client for performancing an act associated with one or more of the transmitted data objects. In the preferred embodiments of the invention shown below such performance monitoring instructions include JavaScript contained in downloaded Web documents and cookies sent to client Web browsers in the HTTP headers with which such data objects are sent. In other embodiments other forms of instructions, such as, for example, Java or ActiveX applets, can be used.

Often the performance monitoring instructions instruct a client to monitor the time required to download a composite data object. They can also instruct the client to measure the time associated with other events, such as the time required to download individual component data objects; to execute a given segment of code, such as Java, JavaScript, or ActiveX code; or to execute a transaction which includes both the uploading and downloading of information, such as the submission of an HTML form and the downloading of a confirmation page. Performance monitoring instructions can also instruct a client to measure when a user aborts the downloading of a Web page. Commonly such instructions measure the time between events occurring in different downloaded objects. For example, download times are commonly measured from the time when a user clicks, within a first Web page, on a link for a second Web page to the time when that second Web page has been downloaded.

In the preferred embodiment of the invention the server creates a representation of the distribution of the client addresses from which performance messages indicating problems come. In such an embodiment, if a large number of such problem messages are sent from clients all across the portion of the network to which the server has sent data objects, the server generates an indication that there is a problem with the server itself If the addresses from which problem messages are sent are concentrated in a portion of the network address space associated with a networkEntity, the server generates an indication that there is a problem associated with that entity. Such entities include Internet Service Provider ("ISP") terminal servers through which users connect to the Internet by modem, and firewall computer through which clients on a corporate local area network connects to the Internet. If a given client computer generates a sufficient number of problem messages but there is not an abnormal number of problem messages associated either with the population of clients to which data objects have been sent or with the population of clients connected to the server through the same networkEntity as the given client, the server generates an indication that the individual given client is having a problem.

Preferably when the server detects a problem with the server, itself, with a networkEntity, or with an individual client, it automatically takes appropriate action. For example, in the preferred embodiment when a problem is detected with the server, the server automatically informs both clients and its operators, and it automatically starts sending out lighter versions of data objects, such as Web pages with fewer or smaller images. If the problem appears to be with a networkEntity or an individual client, it informs affected clients of such problems and offers them the choice of receiving lighter data objects. It is also preferred that the server use indications of download times provided by performance messages to provide an indication to clients of how long the completion of future download times is likely to take.

In the preferred embodiment the server also creates a representation of the distribution of addresses within the server from which data objects for which problem messages have been generated have been sent. If this distribution has a concentration in one portion of the server's address space, such as that associated with one backend server computer, or one hard disk, the server generates an indication that a performance problem is localized within that portion of the server. If there is a concentration of problem messages associated with data objects from one portion of the server, the server automatically responds by decreasing the number of times it will cause that portion of the server to supply a given data object.

If a sufficient number of problem messages indicate a particular composite data object is having a high download time, the preferred embodiment causes the download time of the components of that composite data objects to be monitored. This can be useful, for example, in trying to determine how much of a Web page's slow download time is caused by which component objects. In addition, if such monitoring indicates that the component objects causing the problem are localized on one backend server or hard drive, it can help locate such performance problems.

In the preferred embodiment, some monitoring instruction are only performed for a sampling of requests for a given URL, such as when there is a need to update a certain type of performance statistic on the server.

It is also preferred that the server alter the information it sends in response to a given URL request as a function of the performance messages it has received. For example, it can reduce the size, in terms of bytes, of data objects it sends when there is a performance problem. Similarly it can alter the performance monitoring instructions it sends in response to a URL request.

Many embodiments of the invention are used with a server system which uses IP spreading. In some such embodiments, the server's spreader computer decides which backend server should respond to a given URL request as a function of performance messages which it has received. For example, this can be done as a function of the relative number of problem messages generated in response to objects downloaded from each backend servers. When the server is comprised of multiple computers, as in the case of IP spreading, it is normally preferred that all performance messages generated in response to data objects sent from the server's computers be sent to a single performance monitoring computer. The IP spreader computer is normally the performance monitoring computer, since it often uses the performance monitoring to help determine its IP spreading.

According to another aspect of the invention an IP spreading server system varies which backend server it selectes to respond to a given URL request as a function of the source address of the request. Preferably the system monitors the relative download times to a given portion of the network from different backend servers, and responds to an indication that download times to the given network portion are quicker from a given backend server by increasing the number of URL requests from that network portion it redirects to the given backend server.

According to another aspect of the invention. a server automatically varies the size of Web data objects it sends to clients in response to a given URL request in response to indications the server is having problems responding to URL requests in a timely manner. According to yet another aspect of the invention, a server automatically increases its capacity to transmit data objects in response to such a indication.

DESCRIPTION OF THE DRAWINGS

These and other aspects of the present invention will become more evident upon reading the following description of preferred embodiment in conjunction with the accompanying drawings in which:

FIG. 3 represents the timerWindow Web page which the system of in FIG. 1 uses to help monitor performance on client computers.

FIG. 4 is a simplified pseudo code description of the startTimer function contained within the timerWindow page of FIG. 3;

FIG. 5 is a simplified pseudo code description of the endTimer function

FIG. 6 is a simplified pseudo code description of the checkForNoResponse function contained within the timerWindow page of FIG. 3;

FIG. 7 illustrates a composite Web page containing instructions for monitoring when the page is downloaded and unloaded, and when its component image files are downloaded;

FIG. 8 is a simplified pseudo code description of the startTimer function contained within the Web page of FIG. 7;

FIG. 9 is a simplified pseudo code description of the endTimer function contained within the Web page of FIG. 7;

FIG. 10 is a representation of a frameset Web page which contains performance monitoring instructions;

FIG. 11 is a representation of a frame document which is a component of the frameset Web page shown in FIG. 10 and contains performance monitoring instructions;

FIG. 13 is a representation of a Web page which contains an HTML form and instructions for detecting the time at which the user submits such a form to the server;

FIG. 14 represents a confirmation Web page generated by the server computer in response to the submission of a form by the Web page of FIG. 13, which confirmation page contains instructions for detecting the time when it is downloaded;

FIG. 17 is a simplified pseudo code representation of the data structure of the clientSpaceTree shown graphically in FIG. 15;

FIG. 19 is a simplified pseudo code representation of the serverSpaceTree data structure shown graphically in FIG. 18;

FIG. 20 is a simplified pseudo code representation of the main loop of the spreader computer of FIG. 1;

FIG. 21 is a simplified pseudo code representation of the handleURLRequest function called when the spreader computer receives a URL request from a client;

FIG. 22 is a simplified pseudo code representation of the sendMsgDownClientSpaceTree function which routes information relating to URL requests and performance messages to appropriate nodes in the clientSpaceTree shown in FIGS. 15 and 17;

FIG. 23 is a simplified pseudo code representation of the prepareMsgCookieForResponse function used to cause message dialogue boxes to be generated on client computers which are likely to experience performance problems in their communication with the server;

FIG. 24 is a simplified pseudo code representation of the selectAndRequestAppropriateBackendResponse function used by the spreader computer shown in FIGS. 1 and 2 to select which of the backend servers shown in those figures to relay a specific URL request to;

FIG. 25 is a simplified pseudo code representation of the backend code on each backend server shown in FIGS. 1 and 2 which sends data objects to clients in response to URL requests which had been relayed to it from the server's spreader computer;

FIG. 26 is a simplified pseudo code representation of the handlePerformanceMsg function which uses information from performance messages to update appropriate nodes in the clientSpaceTree shown in FIGS. 15 and 17 and the serverSpaceTree shown in FIGS. 18 and 19;

FIG. 27 is a simplified pseudo code representation of the handlePerformanceMsgForPage function called by the function of FIG. 26 to respond to performance messages associated with downloaded pages;

FIG. 28 is a simplified pseudo code representation of the handlePerformanceMsgForComponent function called by the function of FIG. 26 to handle performance messages associated with downloaded component data objects;

FIG. 29 is a simplified pseudo code representation of the chart program which enables operators of the server to view informantion on the performance of the server and its clients in multiple desired ways;

FIG. 30 is a simplified pseudo code representation of the handleRequestAnsweredMsg function which updates statistics in the serverSpaceTree of FIGS. 18 and 19 each time a requestAnswered message indicates the backend code of FIG. 25 has completed its responds to a URL request;

FIG. 31 is a simplified pseudo code representation of the determineIfServerHasProblem function called by the mainSpreaderLoop of FIG. 20 from time to time to make a determination if the server has problems;

FIG. 32 is a simplified pseudo code description of determineIfThereIsAGeneralServerProblem function called by the function of FIG. 31 to determine if the server appears to have a generalized performance problem;

FIG. 33 is a simplified pseudo code representation of the determineIfThereIsLocalizedServerProblem function called by the function of FIG. 31 to determine if the server appears to have a performance problem localized in an individual backend server or disk;

FIG. 34 is a simplified pseudo code representation of the distributionUpdate function called by the mainSpreaderLoop of FIG. 20 from time to time to determine various statistical information stored by the server needs to be updated;

FIG. 36 indicates how the clientSpaceTree used with the system of FIG. 35 differs from the clientSpaceTree shown in FIG. 17;

FIG. 37 indicates how the selectAndRequestAppropriateBackendResponse function used with the system of FIG. 35 differs from that shown in FIG. 24; and FIG. 38 indicates how the handlePerformanceMsgForPage function used with system of FIG. 35 differs from that shown in FIG. 27.

DETAILED DESCRIPTION OF PREFERRED EMBODIMENTS

Figure 1:
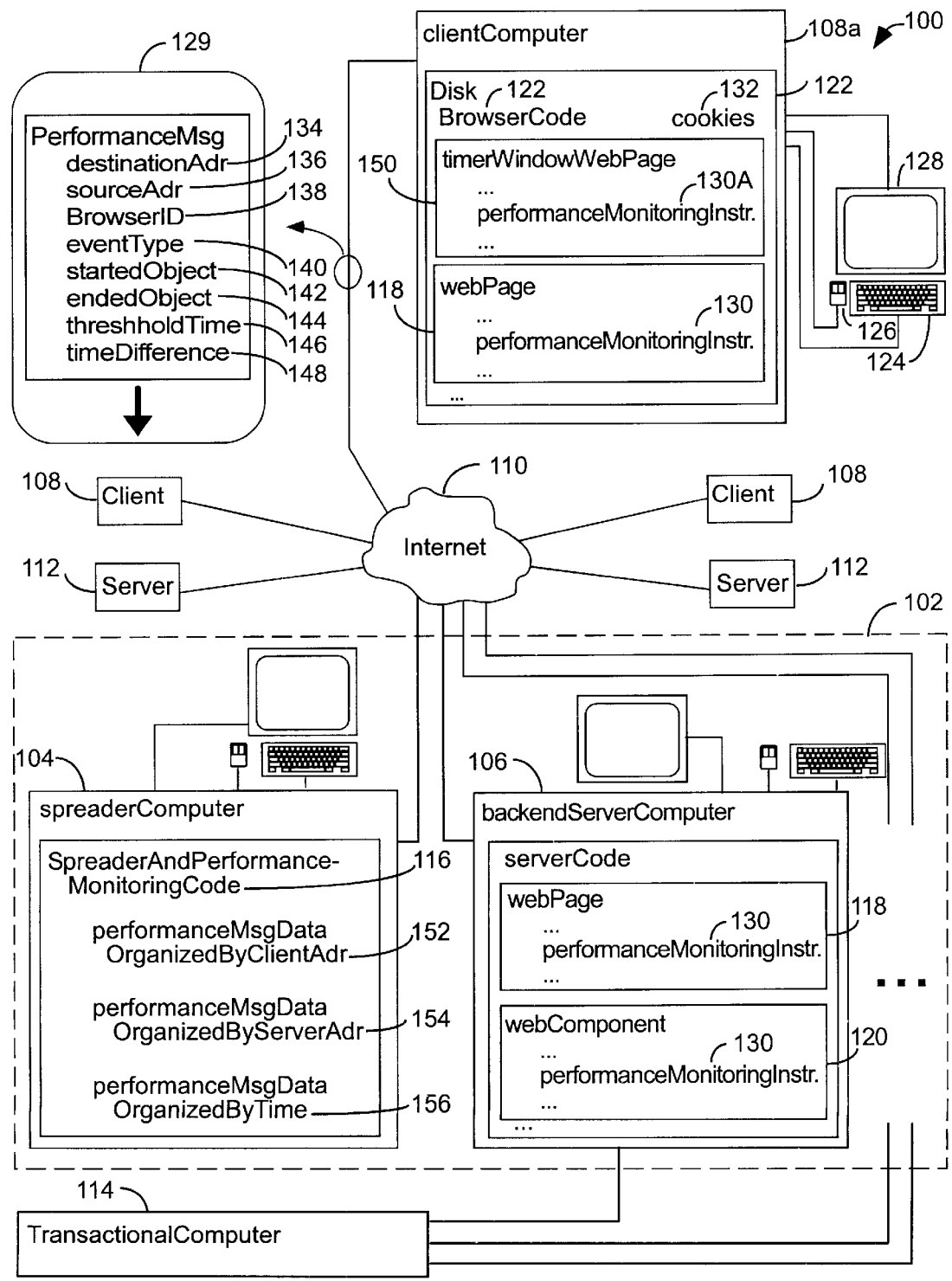
FIG. 1 is a schematic representation of a preferred embodiment of the invention which is a system for performing client-server Web communications which includes a server system that sends Web data objects to client computers via the Internet, showning the server's spreader computer and indicating its plurality of backend server computers.

FIG. 1 illustrates a Web based computing system 100 which comprises a server 102 connected through the Internet 110 to a plurality of other computing systems, including client computers 108 and other server computers 112. The server 102 includes a spreader computer 104 and a plurality of backend server computers 106, only one of which is shown in FIG. 1. The server's computers are connected to each other, and to client computers, through the Internet.

Each backend server 106 is connected to a transactional computer 114 by a computer network not connected to the Internet. The transactional computer 114 runs vital applications, such a major corporate data base applications. Client computers interface to such vital applications through the backend servers, which acts as a "firewall" computer which insulate the transactional computer from invasion by computer hackers.

The spreader computer 104 includes code 116 for performing IP spreading and performance monitoring. This code responds to URL requests from a client by performing IP spreading similar to that described above. That is, it selects which of the backend servers 106 should respond to a given URL request and relays that URL request to the selected backend server with the requesting client's address, not its own, as the source address. The backend server then responds to the relayed URL request by sending the requested data object, such as a Web page 118 or Web component 120 stored on one of its hard disks, onto the Internet. The backend server uses the source address of the relayed URL request, that of the client which sent the URL request to the spreader, as the destination address of the one or more IP messages which contain the requested data object. It uses the address of the spreader computer, not its own, as the source address of such messages. This is done because clients expect messages they receive in response to URL requests to have as their source address the address to which the clients sent such request, which is the address of the spreader computer 104.

In Web applications, each client computer includes browser software 122 which enables a client's user to request individual Web pages from a server by entering input on the client computer's keyboard 124 or pointing device 126. The browser software displays requested Web pages, once downloaded from a server, on the client computer's screen 128. The embodiments of the invention shown in FIG. 1 works with standard JavaScript enabled Web browsers, such as the well know Netscape® Communicator 4.03 browser, distributed by Netscape Communications Corporation.

The server 102 is novel in that, when it downloads a data object to a client in response to a URL request, it includes in that transmission performance monitoring instructions. These instruct the client to send to the server a performance message 129 indicating the time required on the client computer for the performance of an act associated with one or more of such downloaded objects. These instructions most commonly tell the client to monitor the amount of time required for a data objects to be downloaded to the client. Such instructions include JavaScript instructions 130, shown schematically in FIG. 1, and so-called "cookies" 132. JavaScript is a computer scripting language which can be included in HTML documents such as Web pages and Web page component documents. Cookies are named character strings which can be sent in the HTTP headers of communications between many commercially available browsers and servers, and which can be stored on such browsers for specified periods of time.

The performance message 129 normally contains a destinationAdr 134. This specifies the address to which the performance message is to be sent, which is the address of the server system which sent the monitored data object in response to which the client is issuing the performance message. In the embodiment of FIG. 1, this is the address of spreader computer 104, regardless of which backend server 106 has sent the monitored data objects to the client. The performance message also includes a source address 136, which is the address of the client computer 108 sending the message and a browserID 138 which is the ID which the browser has been sent in a cookie by the server system 102. This cookie is set to be permanent and to be included in all subsequent communications which the client's browser program has with the server system 102. This enables the server 102 to keep track of the performance of a given client computer over multiple communication sessions.

The performance message also includes an eventType field 140 which indicates the type of event the message measures. The eventTypes associated with performance messages include pageOnload, componentOnload, pageUnload, pageTimeout, formConfirm, and codeEnd.

A pageOnload eventType means the message's timeDifference field 148 measures the length of time between when the browser was instructed to generated a URL request for a page and when the downloading of the requested page, including all of its components, was complete. A componentOnload eventType means timeDifference measures the time between when a page was requested and when a component of that page, such as an image or a frame document, was fully downloaded. PageUnload means the user of the client elected to leave a page before it was completely downloaded and that timeDifference measures the time between the page's request and when they user elected to leave it. PageTimeout means that a requested page has not yet been downloaded and that the timeDifference since the page's request has been so long that an error has probably occurred which will prevent the downloading of that page. FormConfirm means timeDifference measures the duration between when the user submitted a form to a CGI script file on the server and when the client received a confirmation page from the server. CodeEnd means timeDifference measures the length of time between when the client computer executed a first point and a second point in JavaScript associated with one or more Web documents on the browser.

A performance message's startedObject and endedObject fields 142 and 144, respectively, indicate the URL of the monitored data object in which the events which started and ended the message's timeDifference occurred. In the case of a CodeEnd eventType, the startedObject and EndedObject also include a string appended to such a URL identifying an associated point in the monitored code. For example, if a user's clicking on a link in a first Web page generates a URL request for a second page, a performance message generated in response to the downloading of the requested second page would have the first Web page as startedObject and the second Web page as endedObject.

The performance message's theshholdTime field 146 indicates the duration which the timeDifference was required to equal or exceed before the current performance message could be generated. Often this threshhold is set at a level so that only an undesirable long timeDifference will trigger the generation of a performance message. This is often done to limit communication of performance messages to those which indicate something might be wrong. However, in certain situation the system sets thresholdTime to zero so that it can get an accurate measurement of the entire distribution of performance times for a particular eventType.

Figure 2:
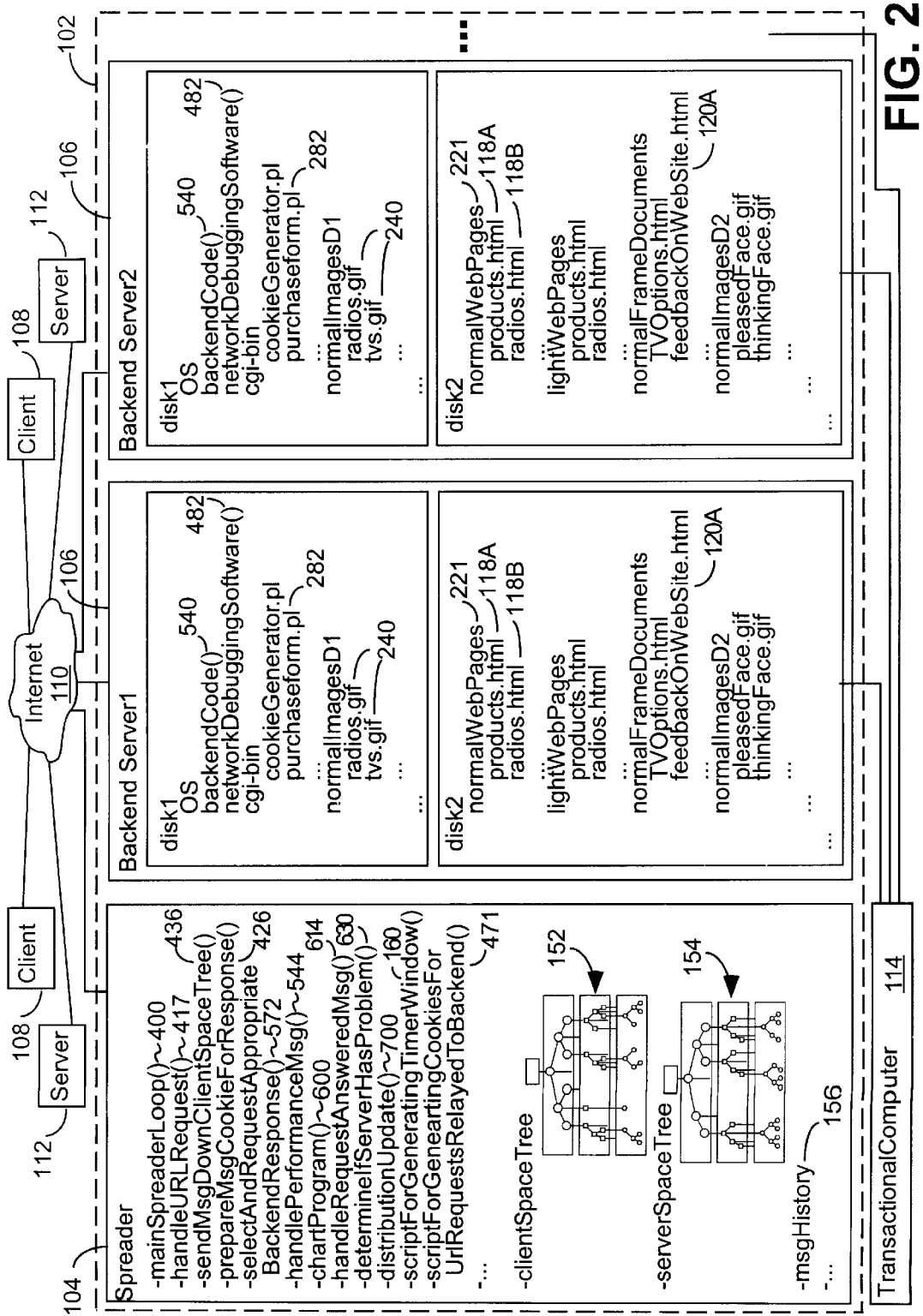
FIG. 2 is another schematic representation of this system providing a more detailed view of its server system.

Information from performance message data received from clients by the server 102 is organized in at least three ways in the spreader computer 104. First, it is stored in a data structure 152 organized by the address of the client computer from which performance messages come. As is shown in FIG. 2 this data structure 152 is called the clientSpaceTree. Second, performance message data is stored in a data structure 154 organized by the URL address within the server system 102 from which the server sent the endedObject whose performance was measured by such messages. As is shown in FIG. 2 this data structure 154 is called the serverSpaceTree. Finally all performance messages and URL requests are stored in a data structure 156 chronologically by the time at which they are received. This is done so they can be analyzed in detail later in many different possible ways by a statistical display software package, when desired. As is shown in FIG. 2 this data structure 156 is called the msgHistory.

FIG. 2 provides a different schematic representation of the server system 102, in which the spreader computer 104 is shown with the three data structures just described, the clientSpaceTree 152, the serverSpaceTree 154, and the msgHistory 156. Also shown are many of the major software functions of the server, most of which are described in more detail below. The backEnd servers 106 are shown with a schematic representation of the files which they store on their hard disks.

FIGS. 3–14 provide simple examples of the types of Web documents which the server system 102 can download to a client computer 108 when using the present invention. In these FIGS., literal HTML or JavaScript text is shown in Courier font and pseudo code is shown in Arial font.

FIG. 3 illustrates a timerWindow Web page 150 of the type illustrated schematically in the browser computer 108A of FIG. 1. When the spreader computer 104 receives a URL request from a client which indicates the client does not already have a timerWindow from the server within the client's browser, the spreader computer 104 responds to the request, not by sending the document requested, but rather by calling a script 160, shown in FIG. 2, which generates and sends a timerWindow Web page of the type shown in FIG. 3. This timerWindow is sent to the browser window which generated the original URL request. As long as this timerWindow Web page stays loaded in the window to which it is sent, that window functions as a timerWindow which performs performance monitoring functions for the browser.

The timerWindow has two benefits. First, the timerWindow re-requests the Web page whose request caused the generation of the timerWindow page. This enables the time of that re-request to be recorded on the client computer so as to provide an accurate start for timing the download of that requested page. Second, because the timerWindow page contains many of the JavaScript perfomance monitoring instructions which generates performance messages, such code does not need to be duplicated in each Web page which is downloaded to the client.

The re-requesting of the URL request which gave rise to the generatio of a given timerWindow page is performed by a JavaScript window.open statement, shown on Line 162 in FIG. 3. This instructs the client's browser to open a new browser window as a child of the timerWindow and to request that the originally requested URL be downloaded and displayed in that child window. The timerWindow page also includes a Line 164 which calls a startTimer function 168, indicating that a pageRequest eventType has occurred with the requested URL as the startedObject. As indicated below, this causes the timerWindow to temporarily record the time of the pageRequest. The timerWindow page also includes a Line 166, which contains a brief text message welcoming the client's user to the server's Web site so the display of the timerWindow page appears to have some purpose to the user.

The timerWindow page stores three functions which can be used to time events for all data objects subsequently downloaded from the server to the client. These include the startTimer function 168, the endTimer function 170, and the checkForNoResponse function 172. In FIG. 3 the bodies of these functions are represented by ellipses. In FIGS. 4, 5, and 6, respectively, they are shown with their bodies, or code definition, represented in pseudo code.

As can be seen from FIG. 4, the startTimer function is called with eventType and startedObject parameters. The possible values for startTimer's eventType parameters include pageRequest, indicating the request of a page from a server; formSubmit, indicating the submission of an HTML form to a server; and codeStart, indicating the start of the execution of a piece of code by the client's browser. The startedObject parameter indicates the URL of the requested page in a pageRequest, the URL of the CGI script file to which a form has been submitted in a formSubmit, and the URL of the file in which code is being measured followed by a string identifying that piece of code in the case of a codeStart.

The startTimer function starts with a Step 174 which test to see if the startedObject's URL comes from the same server as the timerWindow page. If not, Step 174 returns from the function call, because, in the embodiment shown, the timerWindow is only interested in the performance of data objects from its associated server. Next a Step 176 stores the startedObject with which startTimer has been called in a variable named timerStartedObject, a Step 178 stores the current time in a variable called timerStartTime, and a Step 180 sets a variable timerObjectLoaded to False indicating that if the eventType relates to the downloading of a page, that page has not yet been downloaded.

FIG. 5 contains a simplified pseudo code illustration of the function endTimer 170. This function is called with eventType, endedObject, and optional thresholdTime parameters. The eventType indicates the type of event for which the function has been called, and for endTimer this can include all of the eventTypes associated with performance messages, described above, including pageOnload, componentOnload, pageUnload, pageTimeout, formConfirm, and codeEnd. The endedObject parameter indicates the URL of the event's associated page, component, or form, and, in the case of codeEnd it also can include an appended string identifying actual location in the JavaScript which has given rise to the call. The optional thresholdTime indicates how long the timeDifference between the call to startTimer and endTimer has to be before endTimer will send a performance message to the server.

When the endTimer function is called, a Step 182 tests if the endedObject's URL comes from the timerWindow page's server. If not, Step 182 return from the call without doing anything, since as stated above, the server 102 has no interest in monitoring the performance of objects from other servers.

If the endedObject's URL does belong to server 102, Step 184 of endTimer tests if the eventType with which endTimer is called is pageUnload. If so, steps 185 and 187 are performed.

Step 185 erases the pageCookie, if any, associated with the unloaded page. This is done because there is no longer any need to keep any of the page's download monitoring information since the page has been unloaded, and, thus, no more monitoring of it needs to be performed.

Step 187 tests if timerObjectLoaded is True, indicating the user has decided to leave the endedObject page and go to another page within the child browser window created by Step 162 of FIG. 3 after that page has been fully downloaded. This is a normal event felt to be of insufficient note to justify the generation of a performance message. Thus, in this case, Step 187 returns from the call to endTimer. On the other hand, if timerObjectLoaded is False when a pageunload is detected, it indicates a download took longer than a user was willing to wait, an event of greater note. In this case step 187 does not return from endTimer, so as to enable a pageUnload performance message to be generated.

If neither of the conditions in Steps 182 or 187 have been met, the endTimer function advances to Step 186, which sets a variable timeDifference equal to the current time minus timerStartTime, which was set in the previous call to the startTimer function shown in FIG. 4. Next Step 188 tests if the timeDifference just calculated is greater than the thresholdTime parameter with which endTimer has been called. If so, it causes Step 190 to generate and send a performance message form 129 of the general type shown in FIG. 1 to the spreader computer 104. As indicated in FIG. 5, this form contains the client's browser ID; the eventType with which endTimer has been called; startedObject equal to timerStartedObject, the startedObject with which the last call to startTimer of FIG. 4 was called; the endedObject with which endTimer has been called; the thresholdTime with which endTimer has been called; and the timeDifference calculated in Step 186.

The final step of endTimer, Step 192 tests if eventType is either pageOnload, pageUnload, or formConfirm. If this is the case, Step 194 will set timerObjectLoaded equal to True. This is done to prevent a subsequent pageUnload eventType from resulting in a performance message, as discussed above with regard to Step 184–187. It is also done to prevent the checkForNoResponse Function 172 of FIG. 6 from generating a pageTimeout performance message.

The purpose of the checkForNoResponse function is to determine if a requested page or form confirmation page has not been received within a noResponseThresholdTime, indicating it is unlikely the page will ever be received. The timerWindow page of FIG. 3 contains a loop 200, which repeatedly calls the checkForNoResponse function in Step 202 to perform such a check until the value of timerObjectLoaded cleared in the last call to the startTimer function indicates the page has already been received.

As shown in FIG. 6, each time checkForNoResponse function is called, Step 196 tests if the difference between timerStartTime and the current time is over the noResponseThresholdTime If so, Step 198 sends a performance message to the server. This performance message is identical to that sent by Step 190 of FIG. 5, except that its eventType is pageTimeout; its endedObject is Null, meaning no endedObject has yet been received; its thresholdTime equals the noResponseThresholdTime; and its timeDifference equals the current time minus timerStartTime.

FIG. 7 illustrates a Web page 118A designed to be downloaded from the server 102 which enables performance monitoring according to the present invention. This Web page is a composite data object, in the sense that term is used in this specification, because it includes image, or IMG, HTML tags 204 which cause image objects to be downloaded after the document of FIG. 7, itself, has been downloaded causing those downloaded component images to be displayed as part of the Web page.

What sets the Web page 118A apart from prior art HTML Web pages which contain JavaScript, is that it its JavaScript forms performance monitoring instructions. These performance monitoring instructions include "Standard Performance Monitoring Code" 205, which is inserted into every Web page or Web document for which the server 102 wants to do performance monitoring. This Standard Performance Monitoring Code includes startTimer and endTimer functions 206 and 208, respectively, and a segment of code comprising Lines 210–214, which display dialogue boxes in response to message cookies, if any, which may have been downloaded with the document 118A.

FIG. 8 provides a simplified pseudo code description of the startTimer Function 206. This function is called if a user clicks on an HTML link, such as those created by the HREF tags 216 in FIG. 7. The HREF tag 216A, for example, causes the words "Radios" shown on Line 220 to be highlighted on the browser's screen so as to indicate that its text forms an HTML link. As is well known in the art of HTML programming, if the user clicks on such an HTML link, the browser will cause the URL shown in quotation marks on Line 222 to be requested over the Internet. On Line 222, the URL is what is known as a relative URL, in that it starts with the characters "../" which indicate that its URL is to be identical to that of the Document 118A, except that it has a different file name, radio.html. This radio.html Web page file 118B is shown in FIG. 2 on disk2 of the backendServer1, in the same directory as the file 118A of FIG. 7.

Line 223 of FIG. 7 includes a JavaScript onClick statement, which states that when the user clicks on the highlighted link text, "Radios" the JavaScript in quotation marks after the onClick statement is to be executed. In this case, that JavaScript calls the startTimer function 206 with a pageRequest eventType and the URL of the requested file as the startedObject.

Returning to FIG. 8, when the startTimer function is called, a Step 226 tests if there is a timerWindow in the browser, that is, a window in which the timerWindow Web page similar to that of FIG. 3 is currently loaded. If not, startTimer returns without doing anything, because there is no timerWindow to time the occurrence of the start event with which the function has been called.

If, however, a timerWindow is open the rest of the startTimer function is performed. If so, a Step 228 tests if the document whose startTimer function is being called is a page. If so, Step 230 makes a JavaScript call to the starttimer function 168, shown in FIGS. 3 and 4, of the timerWindow page with the same eventType and startedObject parameters the current call to startTimer. If the test in Step 228 indicates the document whose starttimer has been called is not a page document, but rather a component document displayed within a page, Steps 232 and 234 will call the startTimer function in the parent document of which the current document is part with the eventType and startedObject of the current call to startTimer.

As is explained below, HTML Web pages can comprise a hierarchy of one or more nested framesets, which split a browser window up into sub-windows, each of which can have one or more associated HTML documents or even one or more separate associated framesets. Therefore, it is possible for a given Web document to be either a child, great grandchild, or more distantly removed descendant from the Web page which defines the overall image shown within a given browser window. In such a case, a call to startTimer within such a descendant Web document will cause successive calls to the startTimer function in each of that Web document's ancestor Web documents until startTimer is called within a Web page, at which point Lines 228 and 230 of that call to startTimer will make a corresponding call to the startTimer function in the timerWindow.

The endTimer Function 208 contained within the Standard Performance Monitoring Code of FIG. 7 of a document is called when an end event occurs within that document. For example, the image tags 204 of FIG. 7 contain a Java code onLoad statement which causes the JavaScript contained within quotation marks after the word "onload" to be executed once the image associated with that tag has been fully downloaded to the browser. In the example shown in these lines this JavaScript contains a call to the endTimer function with eventType equal componentOnload and with a URL indicating the particular image object 240, shown in FIG. 2, whose download has been completed.

FIG. 9 gives a simplified pseudo code description of the endTimer Function 208. This function has three parameters, eventType, which specifies the type of completion event for which the function has been called; endedObject, which indicates the URL of the object for which, or in, which such a completion event has occurred; and the optional thresholdTime parameter, which indicates the threshold time, if any, which timeDifference must exceed in order for a performance message to be generated in response to the completion event.

Like the startTimer function, the endTimer function starts with a Step, Step 242, which tests if a timerWindow is open in the current browser. If not, there is no timerWindow containing the functions necessary to respond to the endTimer call, and, thus, the function call returns without doing anything more.

If a timerWindow is open on the client's browser, a Step 243 tests if the current document whose endTimer function has been called is a Web page. If so, Steps 244–256 are performed. If not, Steps 257 and 258 are performed.

If the document whose endtimer function has been called is a page, Step 244 tests if a pageCookie has been downloaded in the HTTP header or headers with which the current document was sent from the server 102. If so, Step 246 tests if the data contained in the pageCookie indicates the current eventType with which endTimer has been called is to be monitored or not. If not, it causes the call to endTimer to return without having any affect.

If, however, the current eventType is to be monitored, Step 248 tests if the current call to endTimer contains a defined value for the thresholdTime parameeer. If not, Step 250 tests if the pageCookie has set a thresholdTime to be used for the particular eventType. If so, Step 252 sets thresholdTime equal to that value. If not, Step 254 sets thresholdTime equal to zero, meaning that a performance message will be sent regardless of the time between the start event and the end event being measured. Once the value of thresholdTime has been set, Step 256 makes a call to the endTimer function 170 of the timerWindow, shown in FIG. 3 for the eventType and endedObject with which endTimer has been called and with either the thresholdTime with which that function has been called, or the thresholdTime set in Steps 248–254.

If the test in Step 243 finds that the current document whose endTimer is being called is not a page document, Steps 257 and 258 make a call to the endTimer function in the parent document of the that current document. In a manner similar to that described above with regard to the startTimer function of FIG. 8, the endTimer function, when called within a document, will make a corresponding call to the endTimer in all ancestor documents, if any, until such a call is made to a page document, at which time a corresponding call to the endTimer function in the timerWindow will be made.

Returning to FIG. 7, Line 260 includes an JavaScript "onload" statement. This causes the JavaScript contained in quotation marks after it, in this case a call to endTimer, to be executed when the document of which it is part has been completely downloaded, including the downloading of any component data objects such as those indicated by the image tags 204, shown in FIG. 7.

Line 262 includes a JavaScript "onUnload" statement. This causes the JavaScript contained in quotation marks following "onUnload=" to be executed when the browser detects that the user has caused another page to be loaded into the current window, meaning that the user has left, or unloaded, the current Web page.

From the preceding discussion of FIGS. 3 and 7, it can be seen that if a client computer requests the Web page 118A before a timerWindow has been installed in its browser, the server 102 will generate and download a timerWindow page such as that shown in FIG. 3, with a window.open instruction 162 naming the URL of the Web page 118A as the file to be opened. When this timerWindow page is downloaded, its window will display the statement "Welcome to Company X's Web Site" shown on line 166 of FIG. 3, will make a call to the startTimer function on line 164 to set the timerWindow's timerStartTime to the current time; and then Step 162 will open a new, child browser window and request that the Web page 118A be loaded into it. When that Web page 118A has been fully downloaded to the child browser window, including all of its component parts, the onLoad statement 260 of FIG. 7 will call the endTimer function of page 118A with a pageOload eventType and the URL of page 118A as the endedObject. The endTimer function will then call the endTimer function 170 of the timerWindow page of FIG. 3, which will measure the difference between the current time and timerStartTime set when the page was requested. If that timeDifference exceeds the relevant thresholdTime, the timerWindow's endTimer generates a performance message and sends it to the server.

Each time one of the ".gif" image files identified in an image tag 204 is completely downloaded, the onLoad statements contained in that image tags calls the endTimer function of FIG. 9 in their web page. If the pageCookie associated with the Web page indicates component monitoring is to take place, that endTimer function will call the timerWindow's endTimer function of FIG. 5 for the component and a performance message will be sent indicating the time difference between the time when the image's associated page was first requested and the onLoad of the image, itself If a user clicks on an HREF tag, such as the tags 216 of FIG. 7, the onClick statements in that tag calls the startTimer function of the page 118A shown in FIG. 8 with a pageRequest eventType and a startedObject identifying the URL of the requested page. This will cause a similar call to be made to the startTimer function 168 in the timerWindow page of FIG. 3. When the requested page is subsequently completely loaded into the Web browser, an onLoad statement, similar to that shown in line 260 of FIG. 7, will ultimately cause a call to the timerWindow's endTimer function to complete the timing of that requested page's downloading.

If the user unload page 118A at any time, the onUnload statement 262 of FIG. 7 will ultimately cause a call to the timerWindow's endTimer function with a pageUnload eventType and an endedObject identifying the unloaded page. If this call is made before the timerWindow's timerObjectLoaded variable is True, a performance message will be generated indicating that the user has unloaded the page before its download was complete and stating the timeDifference between when the page was requested and when the user unloaded the page.

If the download of a page requested, either by the window.open statement 162 of the timerWindow or by an onClick statement within another Web document, is not completed within the noResponseThresholdTime from when it was requested, that fact will be detected by one of the repeated calls made to the checkForNoResponse function made by lines 200 and 202 of FIG. 3 and that function will generate a performance message indicating such a failure, as was described above with regard to FIG. 6.

FIG. 10 describes a different type of Web page 118b, which contains a frameset statement 270, which divides the browser window into which it is loaded into a plurality of frames, or rectangular window portions associated with each of the frame statements 272 contained within the frameset statement. This frameset Web page 118b is no different than prior art frameset Web pages except that it includes the Standard Performance Monitoring Code 205 described above with regard to FIG. 7 and an onload statement 274 which calls the endTimer function within such Standard Performance Monitoring Code when the downloading of the frameset Web page and all of its component frames identified by the lines 272 has been completed. Then enables the download time of such a frameset Web page to be monitored by the browser's timerWindow, and, through performance messages, by the server 102.

The frameset statement 270 contained in FIG. 10 is a relatively simple one. As those skilled in the art of HTML programming will understand, it is possible for a frameset to contain as a component not only frame statements 272 but also other frameset statements which themselves can contain either frames or further framesets. However, as was described above with regard to FIGS. 8 and 9, the startTimer and endTimer functions contained within the Standard Performance Monitoring Code will pass calls to those functions up any hierarchy of Web documents contained within a Web page to the Web page, itself, and then on to the timerWindow, regardless of how deep the hierarchy of framesets and frames is for a given Web page.

FIG. 11 provides an example of a frame document "feedbackOnWebSite.html" 120A. This Web document contains standard HTML except for the following: First, it includes the Standard Performance Monitoring Code 205 described above. Second, it contains an onLoad statement 260B which calls the endTimer function of FIG. 9 with a componentOnload eventType and the URL of the frame document as the endedObject when the document and each of its components has been completely downloaded. Third, each of its image tags 204 contains an onLoad statement 237 which call the endTimer with a componentOnload eventType and the URL of their image file as the endedObject when each such image file is completely downloaded. Fourth, each of its HREF hypertext links includes an onClick statement 223 which calls the startTimer function of FIG. 8 with a pageRequest eventType and the URL of the requested page when a user click on such a link so as to request that a new page be loaded into the child browser window.

Because the Standard Performance Monitoring Code passes startTimer and endTimer calls up any hierarchy of Web documents to the timerWindow, componentOnload and pageRequest events within a component document, such as the document 120A shown in FIG. 11, have the same effect as if they had occurred within a Web page, such as that shown in FIG. 7.

Figure 12:
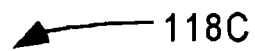
FIG. 12 is a representation of a Web page which includes performance monitoring instructions for measuring the time required to perform a given segment of JavaScript code.

FIG. 12 illustrates a Web page 118C containing performance monitoring instructions for measuring the amount of time required to execute a given segments of JavaScript on a client. This Web page is distinguished from the prior art in that it includes the Standard Performance Monitoring Code 205; a calls 272 and 274, respectively, to the startTimer and endTimer functions of the Standard Performance Monitoring Code before and after a given portion of JavaScript 276 is executed. The call to startTimer has a codeStart eventType, indicating the start of a piece of code to be timed, and a startedObject parameter equals the URL of the page 118C followed by a string identifying the individual point in the code which has been reached at the time of the call. The call to endTimer has a codeEnd eventType and as an endedObject the URL of the page 118C followed by a string identifying the end point in the code which has been reached at the time of its call. The combination of such startTimer and endTimer calls at various points in one or more Web document's JavaScript enable the server computer to monitor the time associated with performance of virtually any desired segment of such script. Normally, however, such calls will not result in performance messages because normally the pageCookie associated with the document 118C will indicate that codeStart and codeEnd eventTypes are not to be monitored.

FIG. 13 illustrates a Web page 118D which contains a HTML form statement 276. This defines a form of text input fields into which a user of the client computer can enter information. The form statement 276, which is only partially shown in FIG. 13, enables the user to enter information such as the item number and quantity of items the user wishes to purchase, the user's name, and other information relevant to making a purchase. The form containing page 118D is distinguished from the prior art by the fact that it contains the Standard Performance Monitoring Code 205, described above, and an onSubmit statement 278 within its form statement 276 which calls the startTimer function in the Standard Performance Monitoring Code when the user pushes a submit button generated by the form statement on the client's screen. This causes the information which the user has entered into the form to be sent to the server computer. When such a form submission takes place, the information contained in the form's fields is sent with a URL corresponding to that defined in the action statement 280 of the form statement. In the example of FIG. 13, this is a file purchaseform.pl 282 contained in the cgi-bin directory shown on disk1 of each of the backend servers shown in FIG. 2. The cgi-bin directory commonly contains CGI scripts which are used by server computers to respond to forms and to dynamically generate Web pages or cookies for Web pages.

FIG. 14 illustrates a form confirmation page 118E which is dynamically generated by the purchaseform.pl CGI script after the form generated by FIG. 13 has been submitted to the server 102 and the information it contains has been sent to the transactional computer 114 shown in FIG. 2. This confirmation page is distinguished from such pages in the prior art by the fact that it contains the Standard Performance Monitoring Code 205, described above, and an onload statement 280 which calls the Standard Performance Monitoring Code's endTimer function when the confirmation page has been completely downloaded. This call has a formConfirm eventType and an endedObject which identifies the URL of the CGI script which generated the confirmation page.

When taken together, the performance monitoring code contained within the form page 118D of FIG. 13 and the form confirmation page 118E of FIG. 14 enabled the total time, as measured from the client's end, for a form transaction to be monitored.

Figure 15:
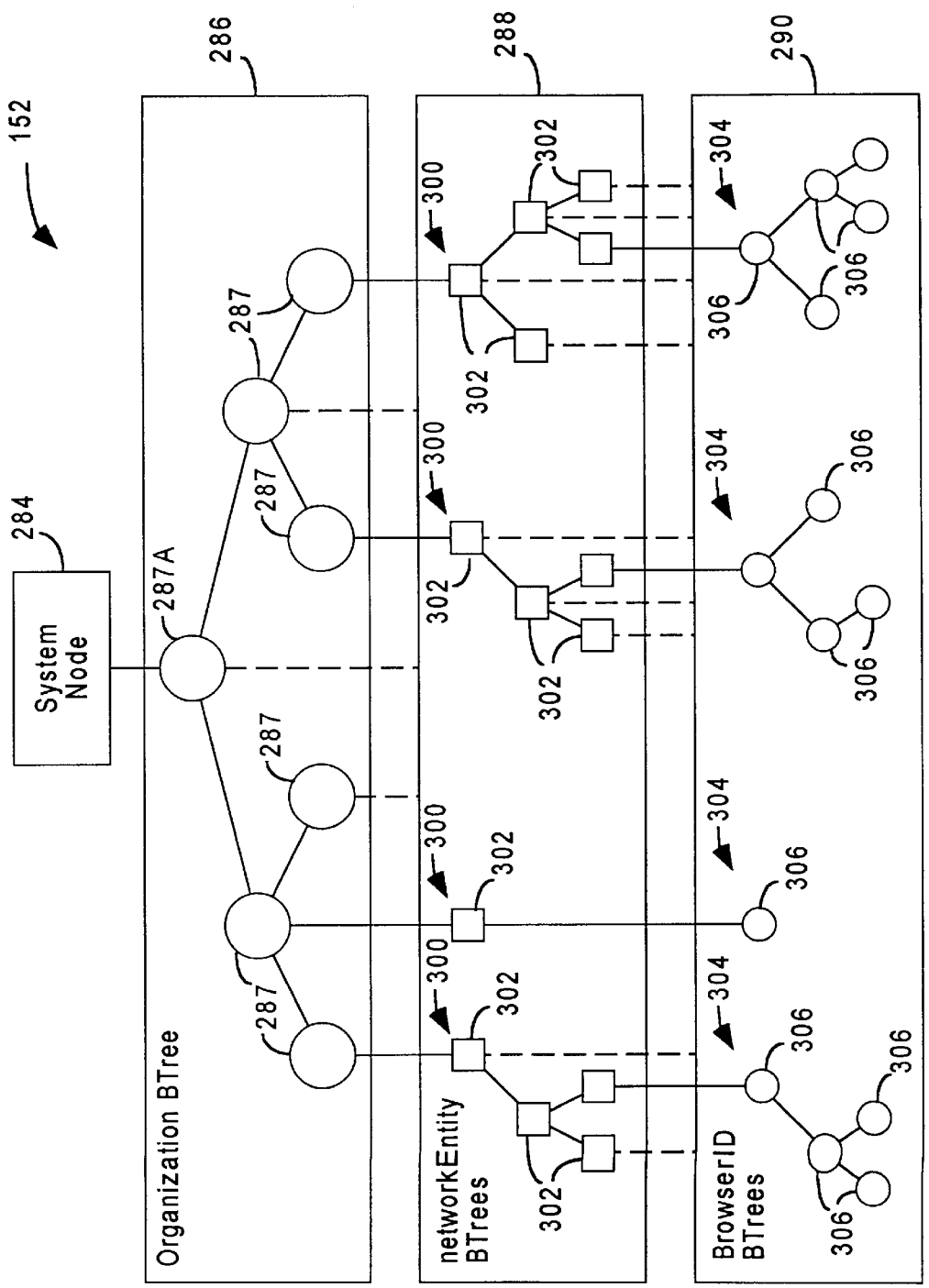
FIG. 15 is a schematic representation of the clientSpaceTree contained within the spreader computer of FIG. 1 which organizes performance messages received from client computers by the domain name of the Internet addresses from which such messages come.

FIG. 15 is a graphical representation of the clientSpaceTree 152. As was stated above with regard to FIG. 1, the server system's spreader computer 104 receives performance messages from clients and organizes them in different ways. The spreader computer uses the clientSpaceTree to organize information from both performance messages and URL requests by the address of the client computers from which such communications have been received. In order to better detect performance problems associated with network entities larger than individual client computers, the clientSpaceTree is organized by the domain names associated with client addresses.

Figure 16:
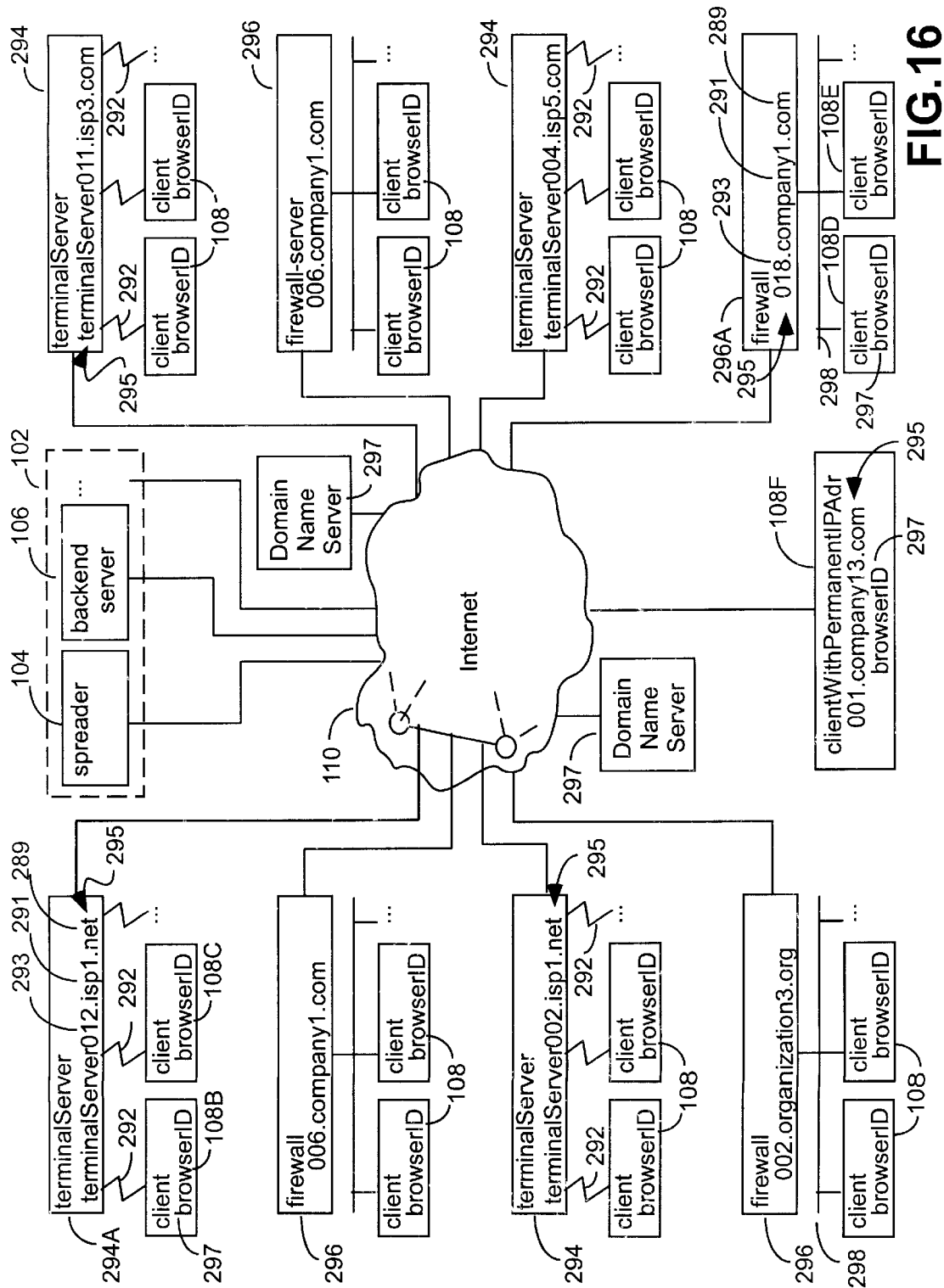
FIG. 16 is a schematic representation of the Internet showing various types of network entities from which client computers can send performance messages to the server and the types of domain names associated with each.

FIG. 16 provides a schematic representation of the relationship between Internet domain names and the client computers connected to the server 102 through the Internet 110. The Internet has a plurality of domain name server computers 297 from which the spreader computer 104 can request the domain name corresponding to the source address from which a given URL request or performance message has been received. In response to such a name request, a domain name servers will return a domain name strings 295 corresponding to the queried source addresses.

Only a small percent of client computers are directly connected to the Internet. Most client computer are connected to the Internet either through terminal servers 294 or firewalls 296.

Client computers which connect to the Internet through Internet service providers ("ISP"), such as America On-Line, usually connect to the Internet through terminal servers. The client computers 108B and 108C shown in the upper left hand corner of FIG. 16, are connected by a telephone link, indicated by the zigged lines 282, to a terminal server 294A, which, in turn, is connected to the Internet. When a client computer connects to the Internet through a terminal server, it normally has one of a range of Internet addresses associated which the terminal server dynamically allocated to it for the duration of its connection.

When the server computer 102 calls an Internet domain name server with the dynamic address associated with such a client, the domain name server will return a domain name string 295 identifying the terminal server 294 to which it is connected. This string contains a tag 289 at the right of the string preceded by a period, or "dot", which identifies the highest level part of the domain name, commonly ".com" or ".net" in the case of a terminal server. The middle portion of the domain name, that containing a dot on each side, is the organization tag 291. This normally contains the name of the organization to which the corresponding Internet address has been assigned. In the case of a terminal server this is normally the name of an ISP, or Internet Service Provider. The leftmost part of the domain name, the networkEntity tag 293, normally identifies the particular networkEntity, such as a terminal server, firewall, or individual computer to which the Internet address has been assigned. In the case of a dynamic address assigned to a client computer connected to the Internet through a terminal server, the networkEntity tag includes the string "terminalServer" followed by a number identifying a particular terminal server of the identified ISP.

Other client computers, such as the client computers 108D and 108E at the lower right corner of FIG. 16, are connected to the Internet through firewall computers 296, such as the firewall 296A shown in that portion of FIG. 16. As stated above, firewall computers are used to insulate an organization's network 298, from invasion by hackers from across the Internet. URL requests and performance messages from clients connect to the Internet through a given firewall all have the same source address, that of the given firewall. This is because such computers are not directly connected to the internet, but rather perform all communication with it through their firewall computer. As is indicated for the firewall 296A, the domain name returned for a client connected to such a firewall has a top level tag 289. For firewalls this tag often has values such as ".com", "org", ".gov", or ".edu". A firewall domain name also normally includes an organization tag 291 identifying the company or organization using the firewall, and a networkEntity tag 293 identifying the particular number within that organization of the firewall from which the message came.

Some client computers, such as the computer 108F at the bottom center of FIG. 16, are connected directly to the Internet, in which case such a computer would often would have both its own fixed domain name and, like all other client computers receiving data objects from the server 102, its own browserID.

As just indicated, the server system 102 identifies client computers not only by their source address, but also by their browserIDCookies. These are permanent cookies the server sends to each client with which it interacts. Once the client has received such a cookie it will send a copy of it in the HTTP header with which any URL request or performance message is sent to the server. This enables the server to recognized a given client which communicates to it through a given terminal server regardless of the given dynamic address it has during a given communication and to distinguish between multiple client computer communicating to it through a firewall even though all such clients have the same source address.

Returning now to FIG. 15, the clientSpaceTree is comprised of four different levels of nodes, each of which contain performance statistics relevant to their associated portion of the space of client computers to which the server has sent monitored data objects. The topmost includes a system node 284 which represents the entire client space. The next level, 286, is the organization btree. This is a binary tree, or btree, containing a separate organization node 287 for each different organization tag 291 contained within an Internet domain name associated with client computers to which the server 102 has sent data objects. The next level, 288, is the network Entity level. It contains a separate networkEntity btree 300 for each organization node in the level above it. Each networkEntity btree includes a separate node 302 for each networkEntity separately identified by the domain names of the server's client computers. The lowest level of the clientSpaceTree is the browserID level 290. This contains a separate browserID tree 304 for each networkentity node 302 identified in the networkEntity level. Each such browserID btree contains a separate browserID node for each separate client computer identified by a separate browserID which has been connected to the server through that tree's associated networkEntity.

As is well known in the computing arts, a btree is a structure for organizing and sorting data objects based on the value of a sort value contained within each such object. When a data object to be sorted is fed to the root node of such a btree, if that object's sort value equals that of the root it is placed in, the object is placed in the root node. If its sort value is less than the root node's, the object is sent to a lesser-valued child node of the root node, which has a sort value less than the root node. If the object's sort value is greater than the root node's, it is sent to a greater-valued child node of the root node, which has a sort value higher than the root node. This process of either placing the object to be sorted in a given node, or of passing it to a lesser-valued or greater-valued child node is repeated at each node of the btree to which the sorted data object is passed until either it has the same sort value as a node it is passed to, or until it is passed to a child node which does not yet have a data object associated with it, in which case the data object is placed in such an empty node. If, for example, in FIG. 15 lesser-valued nodes are to the left and below their parent nodes and greater-valued nodes are to the right and below their parent nodes, then after a series of messages has been passed down such a btree, the tree would contain a set of data objects which have been sorted in ascending order from left to right.

Thus, it can be seen that the clientSpaceTree organizes performance messages at level 286 by the organization running the networkEntity from which they come, at an intermediate level 288 by the particular networkEntity, such as the terminal server or firewall, from which they come, and at a lowest level 290 by the individual browser or client computer from which they come.

FIG. 17 is a pseudo code representation of the clientSpaceTree which indicates the data structures associated with the nodes at each of the levels 284, 286, 288, and 290 of that tree.

Each node of the clientSpaceTree includes a probMsg/msgSent data structure 310 and an increasedOnloadTime data structure 312.

The probMsg/msgSent data structure store a probMsg count and msgSent count. The probMsg count in a node indicates the number of performance messages whose timeDifference is sufficiently long to represent a performance problem which have been sent to the server from clients whose source address corresponds to the part of the domain name space represented by the node. The msgSent count indications the number of URL requests which have been received from clients associated with the node's portion of the domain name space. Like most of the performance statistic data structures of the spreader computer 104, the probMsg/msgSent data structure can records probMsg/msgSent values over a plurality of different time periods, ranging from several minutes to months or even years.

The increasedOnloadTime data structure of a given node in the clientSpaceTree represents the average of all increasedOnloadTime values associated with performance messages coming from clients associated with that node. Each individual increasedOnloadTime value represents the difference between the timeDifference associated with a pageOnload or componentOnload performance message for a given downloaded object and the average pageOnload or componentOnload timeDifference for that object.

Starting at the top of FIG. 17, the system node 284 at the root of the clientSpaceTree includes a system node identifier 285 which identifies the node a the root of the entire tree. It also includes a probMsg/msgSent data structure 310 and an increasedOnloadTime data structure 312 as do all the other nodes of the clientSpaceTree. In addition it includes the organization btree 286.

Each organization node of the organization btree includes the organization tag field 314 which is used as the sort value in the organization btree. This corresponds to the central tag 291 shown in FIG. 16 of a client address's corresponding domain name. Like nodes at other levels of the clientSpaceTree, each organization node includes a probMsg/msgSent data structure 310 and an increasedOnloadTime data structure 312. But unlike nodes at such other levels, each organization node includes an additional probMsg/msgSent data structure, the subtree probMsg/msgSent data structure 310A. This structure records the count of all problem messages and URL requests which have been passed through it associated organization's node 287 in the organization Btree 286 when they are being sorted by the organization btree, even if the message's client address does not correspond to the given node's organization tag. As is described below, such subtree probMsg/msgSent data structures are used to indicate the degree to which a high ratio of problem messages to messages sent is evenly distributed throughout that part of the Internet address space to which monitored data objects are being sent. This helps the server determine when it is suffering a generalized problem. Finally each organization node in the clientSpaceTree also includes a networkEntity btree 300.

Each networkEntity btree is comprised of one or more networkEntity nodes 302, shown in FIG. 15. Each of these nodes includes a networkEntity tag comprised of a concatenation of the rightmost and the leftmost dot separated portions of the domain name, 289 and 293 respectively, shown in FIG. 16 associated with a given source address. This is the sort value in the networkEntity btree. Each networkEntity node also includes probMsg/msgSent and increasedOnloadTime data structure, as described above. Finally, each networkEntity node includes a separate browserID btree 304.

As shown in FIG. 15, each browserID btree is comprised of one or more browserID nodes 306. Each such node includes a browserID 318 which corresponds to the ID value contained in a browserIDCookie which the spreader computer 104 sends with the timerWindow page to each client with which it communicates, so as to uniquely identify that client. Each browserID node also includes probMsg/msgSent and increasedOnloadTime data structures, as described above. Each browserID node also includes a backendContextServer value 320 which identifies which backend server 106, shown in FIGS. 1 and 2, has been allocated to handling context sensitive communications with the browserID node's client during a given browser session. This enables all communications with a given client during a given browser session which require access to a common set of information to be handled by one backend server, so as to reduce the amount of communication between backend servers and between backend servers and the transactional computer 114 necessary to handle such transactions.

Each browserID node also includes a lastProblemMessageTime value 322 which indicates the last time the server sent a message to a client indicating a problem with either the server or by a portion of the network represented by the clientSpaceTree located between the server and the given client. This value is used, as will be described below, to prevent an undue number of such messages from being sent to a given client which is subject to such a problem.

Each browserID node further includes a purchaseHistory data structure 324 which indicates how active a customer the client computer associated with the node has been. This value is used so that if the system is overwhelmed by requests it can seek to provide the highest level of service to those of its clients who are most valuable to its purpose.

The last browser node element shown in FIG. 17 is the optional componentMonitoringBlock 326. This data structure is included in a browserID node if component monitoring is being performed for components of a page that are currently being sent to the node's client. This block includes a URL 328 of the page for which the component monitoring is being performed and a componentFIFO 330 which contains a list 332 of all component URLs which have been requested for the page but which have not yet been sent. As explained below, the componentFIFO is used to enable component objects to be sent to a given page in sequential order when component monitoring is taking place. This enables the time associated with the download of individual component to be measured separately, so as to determine with which, if any, of those components a performance problem is associated.

Figure 18:
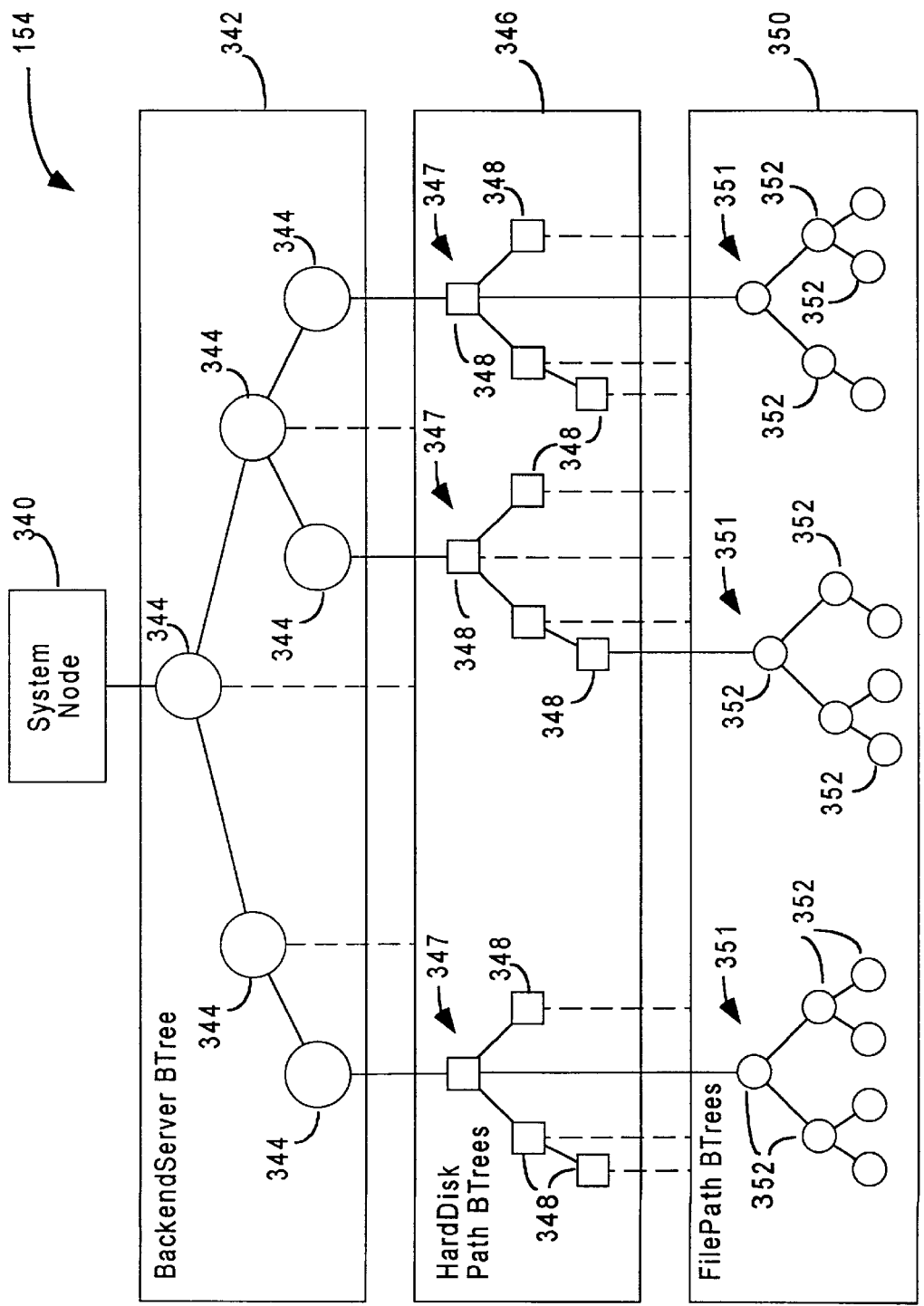
FIG. 18 is a schematic representation of a serverSpaceTree which organizes performance messages by the location in the server from which data objects for which performance messages have been generated have been downloaded.

FIG. 18 is a schematic representation of the serverSpaceTree 154. It shows that it is similar in architecture to the clientSpaceTree. It contains a root node, the system 340, through which all performance messages and the URLs of all data objects sent to client computers are passed down. The next level of the tree is a backendServer btree 342, which includes a node 344 for each backend server contained within the server system 102. Normally the size of this Btree will have many fewer nodes than the organization Btree 286 shown in FIG. 15. This is because there are many thousands of organizations having separate domain names on the Internet, whereas most server systems will have a relatively small number of backend servers. Each backend server node in the backend server Btree 342 contains a separate hardDiskPath btree 347 comprised of one or more nodes 348 for each of the separate hard disks contained within that backend server. These trees are all contained within the hardDiskPath btree level 346 shown in FIG. 18. At the bottom level 350 of the serverSpaceTree, each hard disk node 348 contains a separate btree 351 which is comprised of a separate node for each file on its associated hard disk for which a message has been passed down the serverSpaceTree.

FIG. 19 is a schematic pseudo code representation of the serverSpaceTree 154 similar in form to the representation of the clientSpaceTree in FIG. 17. Each node at each level of this tree includes a set of performance statistics 354. Each such node's statistics set includes a probMsg/msgSent data structure 310B which corresponds to the similarly named data structures 310 described above with regard to FIG. 17. In the serverSpaceTree this data structure indicates the number of problem messages received for data object sent from a node's part of the server and the total number of data objects which have been sent from that node's part of the server. Each node's statistics set 354 also includes a probMsg/formSent data structure 356 which indicates the number of problem messages received with regard to formConfirm eventTypes for CGI scripts associated with their node's part of the server and the total number of form transactions which have been handled by that part of the server. As with the probMsg/msgSent data structure, these statistics are provided for a series of time durations.

Each statistics set 354 also includes a requestsPending data structure. This indicates the total number of URL requests which have been requested from the node's part of the server but which have not yet had complete responses. The statistics set further includes a requestsAnswered data structure 360 which provides a total of the number of URL requests which have been answered by the node's part of the server within various time durations from the current time, a byteSent data structure 362 indicating the total number of bytes which have been transmitted from the node's portion of the server in various time durations, and a responseTime data structure 364 indicating the average time between when URL requests have been received and when all of their corresponding data has been sent out for the node's corresponding part of the server system. Finally each node's statistic set includes an increasedOnloadTime data structure 312A which is similar to the increasedOnloadTime data structure described above with regard to the clientSpaceTree in FIG. 17, except that it relates to increased onload times for data objects downloaded from a node's corresponding portion of the server system.

Starting at the top of FIG. 19, the system node 340 at the root of the tree includes a system node identifier 341, a statistics set 354, and the backendServer btree 342 shown in FIG. 18.

Each backendServer node 344 of the backendserver btree represents one of the backend server computer 106 shown in FIG. 2. Each such node includes a backendServerName 368, which provides the name of the server computer represented by that node. Each such node also includes a statistic set 354, represented by ellipses in FIG. 19, and a hardDiskPath btree 347 comprised of one or more hardDisk nodes 348, shown in FIG. 18, each representing one of the backend server's hard disks.

Each hardDisk node includes a hardDiskPathName which identifies the portion of its associated URLs which identifies the node's hard disk. Each such node also includes a statistic set 354, represented by ellipses in FIG. 19, and a separate filePath btree 351, which is comprised of a separate file node 352 for each file contained in the node's hard drive which has been sent out to a client computer.

Each file node contains a filePathName 372, which includes the file's URL, a statistic set 354 represented by ellipses, and one or more performance time distributions 374.

If the file is a CGI script for handling forms, it includes a formTimeDistribution 376 which includes a statistical distribution of performance times associated with formConfirm performance messages for that file. This distribution is updated when the updateTimeDistribution data structure 382 is set to indicate that sampling to develop such a distribution is to be performed. During this time the thresholdTime value associated with formConfirm eventTypes is set to zero so that the distribution will reflect a normal distribution of formConfirm times for the script file. Similarly, document and image files include onloadTimeDistributions 377 which similarly are updated from time to time to provide a representational distribution of the pageOnload or componentOnload times associated with the file. Page files can include an unloadTimeDistribution 378 which includes the distributions of PageUnload times associated with the page. This distribution provides a valuable indication of how patient users are in waiting for the downloading of complex pages. If a document includes instructions for monitoring the time required to perform a certain piece of JavaScript, the file's node can include a codeTimeDistribution 380 which indicates the distribution of codeEnd times associated with each pair of code start and code end points in the file.

Finally, each file node includes a monitoringInstruction data structure 382 which includes values sent in pageCookies with a given Web page to control how it is monitored. These include a monitored eventType data structure 384 which includes for each eventType an indication 386 of if it is to be monitored for the file and an indication 388 of the thresholdTime which is to be used when monitoring it.

FIGS. 20 through 33 provide simplified, and often partial, pseudo code descriptions of the major functions performed by the server system 102.

FIG. 20 describes the mainSpreaderLoop 400 which controls what functions the spreader computer 104 of the server system 102 performs. It causes the spreader to respond appropriately to various types of messages from clients or from other computers within the server itself and it causes it to perform certain update operations from time to time so as to keep its analysis and responses to performance monitoring relatively current.

As is shown in Steps 402 and 404 of FIG. 20, if the spreader loop receives a URL request from a client it calls the handleURLRequest function 417 shown in FIG. 21.

FIG. 21 shows that when the handleURLRequest function is called for a given URL request, a Step 417 places a copy of the request in the msgHistory data structure 156 shown in FIG. 2. As stated above, msgHistory contains all URL requests and performance messages which have been received by the server organized by time of receipt, so as to enable software to analyze that data in any number of ways that might be desired by an operator of the server system. Next Step 419 tests if the URL request contains a browserIDCookie in its HTTP header. If not, Step 420 generates a new browserID for the request. Then Step 421 tests if the request contains a timerWindowCookie with a browserID matching that of the request's browserIDCookie, either as received with the message or as generated in Step 420. If not, Steps 422 and 423 are performed. Step 423 generates a timerWindow page of the type shown in FIG. 3 for the request, including a window.open line 162 which requests the downloading of the URL requested with which handleURLRequest has been called. Step 422 sends the generated timerWindow page to the requesting client with a permanent browserIDCookie containing the request's browserID. This cookie is set with parameters which cause it to be included in all further communications from the client to the server and so that it will be stored permanently within the browser unless the number of cookies stored in the browser exceeds its threshold. Once Step 422 is complete, Step 423 returns from the call to handleURLRequest.

If handleURLRequest is called with a request containing an appropriate browserIDCookie and timerWindowCookie, a Step 424 tests to see if the URL request is for a Web page. This can be easily determined if Web page documents are placed in different directories within the backend servers than are Web components, as is normally the case. If the URL request is for a page, Steps 425 through 434, are executed.

Step 425 calls the sendMsgDownClientSpaceTree function 436 shown in FIG. 22. This function is called both with URL requests and with problem messages, that is, with performance whose pageOnload time is sufficiently long as to indicate a performance problem.

FIG. 22 show that the sendMsgDownClientSpaceTree function starts with a Step 437 which sends the message with which the function has been called down the clientSpaceTree, and at each node it passed in the various levels of the tree, it performs a set of Steps 438–460.

Step 438 tests if the current node the message is being passed through is an organization node 278 of the type shown in FIG. 15. If so, a Step 440 increments the subtree probMsg/msgSent data structure 310A, shown in FIG. 17, associated with that node. As described below, such subtree probMsg/msgSent data structures are used to indicate the degree to which a high ratio of problem messages to message sent are evenly distributed throughout the space of clients to which data objects have been sent.

Next a Step 442 tests if the current node is associated with the client computer from which the message being sent down the tree came. If so, Steps 444 and 446 are performed. Step 444 increments the probMsg or msgSent count of the probMsg/msgSent data structure, depending, respectively upon whether or not the message is a problem message or a URL request. This enables the node to keep track of the ratio of problem messages to monitored data objects which have been sent to its associated one or more client computers. Step 446 tests if the node has had a problemNode indication attached to it. If so, Step 446 calls the prepareMsgCookieForResponse function 462, shown in FIG. 23.

FIG. 23's prepareMsgCookieForResponse function is designed to generate a msgCookie which is sent along with the HTM header used when sending a response to a URL request. Lines 210–214 of the Standard Performance Monitoring Code shown in FIG. 7 respond to such a cookie by displaying a dialog box to the user providing information about the problem, and in some cases offering the user options for responding to the problem.

The prepareMsgCookieForResponse function starts with a Step 464 which tests if the lastProblemMsgTime variable 322, shown in FIG. 17, in the message's corresponding browserID node indicates a problem message has been sent to the message's client computer within the last five minutes. If so, the call to prepareMsgCookieForResponse returns without doing anything more, so as to prevent the user from receiving too many repeated problem messages. If not, the Step 464 causes the Steps 466–480 to be performed.

Step 466 sets the browserID node's lastProblemMsgTime to the current time, to indicate it is sending out a message at the current time. Then Step 468 tests if the problemNode with which prepareMsgCookieForResponse has been called is the root node 284 of the clientSpaceTree. If so, Step 470 is performed, which sets a CGI script 471 shown in FIG. 2 to send a msgCookie out in the HTTP header of the response to the current URL. This will cause lines 210 through 214 of the Standard Performance Monitoring Code, shown in FIG. 7, to display an alert dialog box which states that the server appears to be having a problem and it states the estimated increase in download time to be expected as a result of that problem, based on the value of the increasedOnloadTime data structure 312 associated with the root node. The dialog box also states that during the problem, the server will send out lighter versions of Web pages where possible, normally meaning it will attempt to send out pages with fewer or smaller component image files so as to reduce the server's backlog.

If the problemNode is other than at the root of the clientSpaceTree or at a browserID node, the test of Step 472 will be met and Step 474 will be performed. This will cause a CGI script to send a msgCookie with the response to the current URL request which causes a confirm dialog box to be displayed on the client's browser. This dialog box identifies the portion of the Internet associated with the problemNode by the portion of the Internet domain name associated with that clientSpaceTree node, and it states that such network portion appears to be having a problem. It also states an estimated increase in download time based on the node's increasedOnloadTime value, and it has a button with associated JavaScript which offers the user an option of sending from the client computer a versionType message specifying that during the problem, light versions of Web pages are to be sent to the individual client.

Finally, if the problemNode for which prepareMsgCookieForResponse has been called is a browserID node, Step 476 will cause Steps 478 and 480 to be performed. Step 478 is identical to Step 474 except that the confirm dialog box it causes on a user's screen states that the problem appears to be with the user's individual client computer. Step 480 sets a script to send a second msgCookie with the response to the URL request which causes a second confirm dialog box to be displayed on the user's screen after that created in response to Step 478 has been exited by the user. This second dialog box includes a user selectable button and associated JavaScript which will cause the client to send a request to the server computer for networkDebuggingSoftware 482 shown in disk1 of backendSever1 in FIG. 2. If the server receives such a request, it sends the networkDebuggingSoftware to the client computer to help its user determine the cause of the client's problem.

Returning to FIG. 22, once the test of Step 442 and its subSteps 440 and 446, if evoked, are complete, the sendMsgDownClientSpaceTree function advances to Step 450 which tests if any ancestor nodes of the current node for which the function of FIG. 22 has been called has a problemNode indication. By ancestor nodes, I means only ancestor nodes in the clientSpaceTree which correspond to the address of the current message being passed down that tree. The test of Step 450 is made because the system only specifically labels and sends messages to clients about the highest network level problem relating to them. If there is no such higher level problem identified within the clientSpaceTree, the test of Step 450 is met and Steps 452–460 are performed.

Step 452 tests if the current node's probMsg/msgSent data structure confirms a problem. This occurs if the probMsg/msgSent data structure contains sufficient data in a currently relevant time frame to indicate that its clientSpaceTree node currently has a high probability of having pageOnload performance problems for any pages sent to the node's corresponding part of the client space. If these statistic confirms such a problem, Step 454 places a problemNode indication on the current node so that any subsequent calls to sendMsgDownClientSpaceTree with a URL request having a source address corresponding to that node will cause a call to be made to prepareMsgCookieForResponse in Step 446, so as to inform the user of such a problem. If the test in Step 452 does not confirm that there appears to be such a problem with the node, Step 456 tests if the node is currently marked as a problemNode. If so, Steps 458 remove the problemNode indication from the current node and Step 460 removes any versionType=lightDuringProblem indications associated with the current node or any child nodes corresponding to that node's addresses. This is done so that if a user has selected to have lighter Web documents sent to him or her during a problem in response to the confirmation boxes caused by Steps 474 and 478 of FIG. 23, that selection will be revoked once the corresponding problem no longer exists.

Returning now to FIG. 21, once the call to sendMsgDownClientSpaceTree on line 425 has been completed for the handling of a given URL request for a page, Step 431 sets a CGI script in the spreader computer 104 to ensure that a pageCookie is associated with the response to the current URL request.

Next Step 426 performs a three part test. First it tests if the server computer currently has been set to perform component monitoring. Then it tests if the probMsg/msgSent count in the requested page's associated filePathName node in the serverSpaceTree shown in FIGS. 18 and 19 indicates a problem. Finally it tests to confirm that there are not any problemNode indications in the browserID, networkEntity, or organization node associated with the client from which the page request came. If these three conditions are met, the system's operators have instructed that component monitoring be performed on pages with performance problems, the requested page has a performance problem, and there are no network problems which might interfere with such component monitoring. In this case, performance monitoring should be performed on the downloading of the requested page to the requesting client, and, thus, Step 427 and 428 are performed. Step 427 creates a componentMonitoringBlock 326, shown in FIG. 17, in the browserID node of the client from which the current URL request has come. Step 428 sets the server script of page 431 so that the pageCookie generated for the response to the current page to include monitoring instructions indicating steps 246 and 248 of FIG. 9 that componentOnload time monitoring is to be performed with a thresholdTime equal to zero.

The combined effects of Steps 427 and 428 is to cause a componentOnload performance messages to be generated for each component of the requested Web page which is sent out, so that the download time associated with individual component of the page can be measured. When the resulting componentOnload performance messages are passed through the serverSpaceTree, the resulting updates to probMsg/msgSent data in that tree will help enable the system to better determine which portions of the server are having problems. Component monitoring can be useful because if a page is having slow download times, that delay may not be associated with the downloading of the page file itself, but rather with the downloading of one or more components which are parts of that page's display. Component monitoring makes it possible to determine if this is the case. It is possible, for example, for component documents to come from different disks or different backend servers than the page document which uses them. Component monitoring makes it possible to detect the location of problems within the server system which might be causing the slow download of components.

If the test of Step 426 is not met, Step 429 and 430 will delete the componentMonitoringBlock, if any, associated with the browserID node of the client making the current URL page request, since no component monitoring is to be performed on the downloading of the requested page to the browserID's client.

Next Step 432 tests if any monitoringInstruction data structure 382, such as that shown in FIG. 19, have been associated with any of the nodes corresponding to the path of the requested file in the serverSpaceTree. If so, Step 434 causes the pageCookie to be generated for the response to the current URL request to include the monitoring instructions most specific to the file in that path down the serverSpaceTree. These monitoring instructions, along with those, if any, placed in the cookie by step 428, will be used by Steps 246 through 252 of the endTimer function of FIG. 9 to determine what eventTypes are to be monitored for that page and what thresholdTimes are to be used in monitoring those eventTypes.

If, the URL request for which handleURLRequest has been called is for a component of a Web page, as would normally be indicated by the file path contained within its URL, the test of Step 498 is met, causing Steps 500 through 508 to be performed.

Step 500 tests if the browserID associated with the client generating the current URL request has a componentMonitoringBlock 326 of the type show in FIG. 17. If so, it indicates that the current URL is for a component which is part of a Web page whose component download times are to be monitored. If so, Steps 502–508 are performed. Step 502 tests if the componentMonitoringBlock's componentFIFO 330 shown in FIG. 17 already has a component URL located in it. If so, component monitoring is being performed for the page of which the requested component is part and another component of that page is currently being downloaded. In this case Step 504 places the current URL, for which handleURLRequest has been called, at the end of the componentFIFO queue, for downloading at a later time, and Step 508 returns from the call to handleURLRequest. This is done so that only one components of a page undergoing component monitoring will be downloaded at a time, enabling the download time for such page components can be measured individually. If the componentMonitoringBlock's FIFO is empty, the execution of the handleURLRequest advances directly to Step 510 which responds to the URL request.

Regardless of whether the URL request with which handleURLRequest has been called is for a page, page component, or form handling script, the execution of handleURLRequest will ultimately advance to Step 510, which calls the selectAndRequestAppropriateBackendResponse function 512 of FIG. 24. The only exception is the case described above with regard to Step 502–508 which occurs if component monitoring is being performed and there is a previously requested URL in the associated componentFIFO. In that case, the call to selectAndRequestAppropriateBackendResponse will be made when a performance monitoring message indicates that the previous URL request in the componentFIFO has been completely downloaded.

FIG. 24 provides a simplified description of the selectAndRequestAppropriateBackendResponse function 512. When this function is called for a given URL request, Step 513 tests if any browserID, networkEntity, organization, or system node in the clientSpaceTree corresponding to the client making the current URL request with which the function has been called includes either a problemNode indication or versionType set equal to lightDuringProblem indication. If any such indications are found, Step 514 sets currentVersionType equal to light, which means that, if possible, a light version of the requested URL is to be sent. The default value for currentVersionType is normal, meaning that a normal version of the requested file should be sent.

Next a Step 516 tests if a data structure called the URLVersionList has an entry for the requested URL specifying a URL of the currentVersionType. If so, Step 518 sets currentURL equal to the URL of that equivalent version. If not, Steps 520 and 522 set currentURL equal to the requested URL.

The combinations of Steps 514 and 522 enable the system to replace the requested URL with an equivalent light version of the URL if the server system has such a light version, if either the system or the user has selected that light versions be sent during a problem, and if the system is having a problem which affects the current request.

Next Step 524 uses the serverSpaceTree to find all copies of the currentURL on the server system 102 by looking for all files which have the same path as the current URL below that portion of the URL which specifies backend server and hard disks. It places all such copies of the curentURL on a copyURL list. Then Step 525 tests if the current URL is one for which it is best to maintain backend server context. Maintaining backend server context mean ensuring that all URL requests of certain types from a given client computer will be handled by one backend server so that that server will be able to maintain all information necessary for one or a sequence of transactions, thereby reducing the need for communication between backend servers and between backend servers and the transactional computer 114 shown in FIG. 2. It is particularly valuable to maintain server context with requests for CGI scripts handling forms, since they tend to involve transactions with clients.

If the test of Step 525 finds that the current URL request is one for which maintaining backend context is appropriate, Step 526 limits the copyURL list to URLs from the backend server identified in the request's corresponding browserID's backendContextServer field 320 shown in FIG. 17. If the backendContextServer value for the browser has not yet been defined, this Step does not limit the copyURL list. Next Step 528 selects that one of the remaining copyURLs whose hardDisk node has the lowest probMsg/msgSent ratio in the serverSpaceTree. This is done so the IP spreading performed by the spreader computer 104 will tend to minimize allocation of requests to backend servers and hard drives whose download times are generating the highest ratio of performance problems.

Next a Step 529 tests for two conditions: first, that the currentURL requires backend server context; and, second, that the request's associated browser's backendContextServer field 320, just discussed with regard to Step 526, is undefined. If both these conditions are met, Step 530 sets the browser's backendContextServer to the server on which the just-selected copyURL is located.

Then a Step 531 generates a relayed URL request for the selected copyURL with the address of the client computer as the source address and with any cookies which have been set by scripts on the server computer and sends it on the network to the selected backend server.

Once this message has been sent, it will be received by the backend server 106 shown in FIG. 2 to which it has addressed and will be responded to by the backend server code 540 shown in FIG. 25.

FIG. 25 shows that this backend server code includes a Step 541 which responds to the receipt of such a relayed URL request by causing Step 542 and 543 to be performed. Step 542 sends out the requested data object to the requesting client with the spreader computer's IP address as the source address, rather than the address of the backend server. When it transmits the requested object it includes in the HTTP headers associated with such transmissions copies of any cookies contained in the relayed URL request.

Once the requested object has been completely transmitted by the backend server, Step 543 sends a requestAnswered message to the spreader computer. As is described below with regard to FIG. 30, when a requestAnswered message sent by Step 543 of the backend code is received by the spreader computer 104, it will be used to update performance statistics in the portion of the serverSpaceTree corresponding to the data object sent.

Returning now to the selectAndRequestAppropriateBackendResponse function of FIG. 24, after Step 531 generates the relayed URL request to a selected backend server, Step 532 sends a copy of the relayed URL request down the serverSpaceTree and for each system, backendServer, hardDisk, and file node corresponding to the URL of that relayed request, it performs Steps 533 through 538.

Step 533 increments the appropriate msgSent or formSent counts, respectively, in the probMsg/msgSent or probMsg/formSent data structures of the current node of the serverSpaceTree, depending, respectively, on whether the URL request is for a page or page component, on one hand, or a form handling script, on the other. Step 534 increments the requestsPending count 360 associated with the current node. Then Step 536 tests if the current node being updated is a file node 352. If so, a Step 538 creates an entry for the URL request in the openRequestList 381 shown in FIG. 19. This entry includes the current time and the URL, client address, and browserID for the request. As will be explained below, when a requestAnswered message generated by Step 543 of FIG. 25 is sent by a backend server indicating that the request has been completely answered, that message will be paired with the corresponding request entry in the openRequestList, and the combination of those messages and their associated times will be used to update the requestsPending and responseTime statistics associated with each corresponding system, backendServer, hardDisk, and file node in the serverSpaceTree.

When the call to selectAndRequestAppropriateBackendResponse function on line 510 of FIG. 21 is complete, the handleURLRequest function is also complete.

Returning now to FIG. 20, if the mainSpreaderLoop 400 receives a performance message from a client computer, Steps 403 and 404 will call the handlePerformanceMsg function 544 shown in FIG. 26.

As is indicated in FIG. 26, when this function is called with a performance message, Step 546 labels the message with the current time and places it in the msgHistory 156 shown in FIG. 2. Next Step 548 tests if the performance message is for a pageOnload or pageTimeout eventType, in which case it calls the handlePerformanceMsgForPage function 564 shown in FIG. 27.

FIG. 27 show that when handlePerformanceMsgForPage is called for a performance message, Step 566 tests if its onload time is over a given thresholdTime used to determine whether the message should be classified as problem message or not. If it is classified as a problem message, Steps 568 through 572 are executed. Step 568 calls the sendMsgDownClientSpaceTree function 421 described above with regard to FIG. 22. This will update the probMsg counts in the probMsg/msgSent data structures associated with the appropriate nodes in the clientSpaceTree and will determine if the resulting change in such counts indicates that any such node should be marked as a problemNode. Next Step 570 of FIG. 27 sends the problem message down the serverSpaceTree and at each system, backendServer, hardDisk, or file node it reaches which corresponds to the path of the performance message's endedObject, it performs a Step 572 which increments the probMsg counts in that node's probMsg/msgSent data structure.

Once this has been done, Step 574 tests for two conditions: first, that the page's updateTimeDistributions data structure 328 shown in FIG. 19 indicates that onload time statistics are currently to be updated for the page; and, second, that there is no problem indicated by probMsg/msgSent values in any corresponding node in the serverSpaceTree. If both these conditions are met, Step 576 uses the performance message's timeDifference value to update the page's onloadTimeDistribution 377 shown in FIG. 19.

Regardless of whether the page's onload time is used to update its onloadTimeDistribution, Step 578 finds the difference between that onload time and the average onload time indicated by the page's onloadTimeDistribution and uses that difference to update increasedOnloadTime values in related nodes in both the clientSpaceTree and serverSpaceTree. This is done to update the indications of the delay, if any, in the downloading of pages associated with such nodes. Although not shown, the increasedOnloadTime value in each node is updated with a below problem message thresholdTime for each msgSent count supplied to that nodes probMsg/msgSent data structure, so that value will provide a better estimate of the average increase, if any, in pageOnload times.

Returning now to FIG. 26, if the call to handlePerformanceMsg function has been made for a componentOnload eventType, Step 550 will call handlePerformanceMsgForComponent function 580 shown in FIG. 28 for the message.

FIG. 28 shows that when this function is called for a componentOnload performance message, a Step 582 derives the component's individual onload time. This is done because the timeDifference of a given component's performance message measures the cumulative time from the requests for a page to the completion of the downloading of the given component. To calculate the portions of that timeDifference with is associated with the request and downloading of the given component, Step 582 subtracts from the message's timeDifference the timeDifference reported by the performance message generated for the previous component in the componentFIFO 330 in the corresponding page's node in the clientSpaceTree. The resulting difference corresponds to the time between when the client computer generated the performance message for the previous component and when the current component was completely downloaded. Using such individual onload times makes it more easy to determine if there are localized performance problems associated with the individual backend server or hard disk on which an individual component object might be located. In this embodiment of the invention, such individual onload times are not obtained or used for the first component downloaded for any page.

After Step 582 has attempted to calculate the current component's individual onload time, Step 584 tests if that individual time exceeds a thresholdTime indicating a problem. If so, the performance message is considered to be a problem message, and Step 586 sends the performance message down the serverSpaceTree incrementing probMsg values in the probMsg/msgSent data structures of the system, backendServer, hardDisk, and file nodes matching the URL of the message's endedObject.

Next Step 588 tests if the browserID node associated with the client from which the performance message has come has a componentMonitoringBlock 326 of the type indicated schematically in FIG. 17, as is normally the case when a componentOnload performance message is received. If so, this indicates performance monitoring is being performed on components of the page currently being sent to that browser. If this is the case, Steps 590 through 594 are performed. Step 590 removes the component's corresponding URL entry from the componentMonitoringBlock's componentFIFO 330 shown in FIG. 17. Then Step 592 tests if there is another component URL listed in the FIFO buffer. If so, a Step 594 calls the selectAndRequestAppropriateBackendResponse function, described above with regard to FIG. 24, to cause a data object corresponding to the next component URL in the FIFO buffer to be sent out to the requesting browser.

Once the test of Step 588 and any Steps it cause to be executed have been completed, Step 578 tests to see if two conditions are met: first, that the updateTimeDistributions data structure 382 associated with the component's file node in the serverSpaceTree indicates onloadTimeDistribution statistics are to be updated for the component's file; and, second, that no performance problem is indicated by the probMsg/msgSent values of any node in the serverSpaceTree corresponding to the component's URL. If both of these conditions are met, it is appropriate to update the onloadTimeDistribution statistics in the performance message's file node, and Steps 598 and 599 are performed. Step 598 updates the component's onloadTimeDistribution 377 shown in FIG. 19 with the performance message's individual onload time. Step 599 finds the difference between the performance message's individual onload time and the average of the component file's onloadTimeDistribution and use that difference to update increasedOnloadTime values in related nodes in both the clientSpaceTree and serverSpaceTree.

Returning to FIG. 26, if the call to handlePerformanceMsg is made with a formConfirm performance message, Step 552 will cause Steps 553 through 558 to be performed.

Step 553 tests if the message's timeDifference exceeds a problem threshold. If so, the message is considered a problem message and Step 554 sends it down the serverSpaceTree incrementing probMsg values in the probMsg/formRequest data structure 356 in the statistics sets 354 associated with the system, backendServer, hardDisk, and file node corresponding to the URL of the message's endedObject.

Next Step 556 tests if two conditions are true: first, that the updateTimeDistributions data structure 382 shown in FIG. 19 for the message's corresponding script file indicates the file's formTimeDistribution 376 is to be updated; and, second, that none of the probMsg/msgSent data structures in any of the file's corresponding nodes in the serverSpaceTree indicate a performance problem. If both these conditions are met, Step 558 uses the message's timeDifferences to update the form handling file's formTimeDistribution.

If the handlePerformanceMsg function is called with a pageUnload performance message, Step 560 will cause Step 562 to use the message's timeDifference to update the unloadTimeDistribution 378, illustrated in FIG. 19, for the message's associated page file node.

Returning to FIG. 20, if the mainSpreaderLoop 400 receives a versionType message, Step 405 causes Step 406 to place a corresponding versionType indication in the browserID node of the client from which the versionType message was sent. As is indicated above with regard to Steps 474 and 478 of FIG. 23, when a given part of the network has a performance problem, diaolog boxes will be generated in web pages sent to clients in the that part of the network. These dialog boxes will contain buttons offering clients the option having lighter versions of Web pages sent to reduce download times. If a user selects such a button, the script associated with it will send a versionType message with versionType equal to lightDuringProblem to the server. It is to such a message that Steps 405 and 406 respond by storing a versionType equal lightDuringProblem in the corresponding client's browserID node.

If the mainSpreaderLoop of FIG. 20 receives a request for analysis software sent in response to a user's selection of a button generated in response to Step 480 of FIG. 23, Step 407 and 406 will send the networkDebuggingSoftware 482 shown in FIG. 2 to the client's computer.

If the mainSpreaderLoop receives a request to use the spreader computer's charting program from an authorized client, such as an operator of the server 102, Step 410 calls the charting program 600 shown in 29 in a separate process dedicated to communicating with that user.

FIG. 29 provides a simplified representation of the charting program. As indicated in that figure, this program includes: a Step 602 which lets a user pick the nodes in the clientSpaceTree or serverSpaceTree for which he or she wants to see data; a Step 604 which lets the user pick the data of each such node represented in FIGS. 17 or 19 to be displayed, including the time frame from which such data is to be drawn; a Step 606 which lets the user pick the type of presentation he wants for such data, such as graphs or bar charts; a Step 608 which generates an image containing a representation of such values for each of the selected tree node types; and a Step 610 which displays the image to the user. The representation of FIG. 29 is extremely simplified. In real life the charting program would have additional features, including the ability to analyze data from the msgHistory, and would allow a user to make many of the choices shown in Steps 602 604 and 606 by means of one or more dialogue boxes.

If the mainSpreaderLoop of FIG. 20 receives a requestAnsweredMsg of the type generated by Step 543 of the backend code shown in FIG. 25, Step 411 and 412 to call the handleRequestAnsweredMsg function 614 shown in FIG. 30 for the message.

FIG. 30 shows that the handleRequestAnsweredMsg function performs a Step 616 which sends the requestAnswered message with which it has been called down the serverSpaceTree, causing Steps 618–628 to be performed for each system, backendServer, hardDisk, and file node corresponding to the message's URL.

Step 618 increments the node's requestsAnswered value; Step 620 updates the node's bytesSent value; and Step 622 decrements the nodes requestsPending value. These Steps help enable each node to keep accurate indications of how many messages and how many bytes its corresponding part of the server system has sent out, and how many unanswered URL requests are still pending on that part of the server.

Next Step 624 tests if the current node is a file node. If so, Steps 626 through 628 are performed.

Steps 626 calculates the server response time for the handling of the requestAnswered message's associated URL request. It calculates this time from the difference between the current time and the time of the message's matching entry in the openRequestLists 381, shown in FIG. 19. Such server response times are different than the download times calculated by monitoring client request and onload times, since they only measure the time between when the server first receives a URL request and when it completes sending out the response to that request. Although server response times are often correlated to the download times measured on clients, they can, at times be quite different. This is true because download delays are often caused by communications between the server and the client and because merely measuring the server response time for the sending of a Web page provides little information about the time it takes to completely display that page.

Next Step 627 deletes the RequestAnswered message's matching request from the openRequestList and then a Step 628 passes the calculated server response time up the serverSpaceTree, updating responseTime values 364 in the statistics sets 354 associated with each system, backendServer, hardDisk, and file node corresponding to the message's URL.

Returning to FIG. 20, a Step 413 of the mainSpreaderLoop repeatedly tests if the time since the last call to a determineIfServerHasProblem function 630 shown in FIG. 31 exceeds a threshold time. If so, Step 413 call that function.

FIG. 31 shows that this function is comprised of a line 632 which the calls the determineIfThereIsAGeneralServerProblem function 636 shown in FIG. 32 and then a line 634, which calls the determineIfThereIsALocalizedServerProblem function 638 shown in FIG. 33.

FIG. 32 shows that the determineIfThereIsAGeneralServerProblem function starts with a Step 640. Step 640 attempts to find a set of the eight organization nodes 287 of the clientSpaceTree, illustrated schematically in FIG. 15, which most evenly divide the recent msgSent counts in the subtree probMsg/msgSent data structures 310A, shown in FIG. 17, of such organization nodes. The purpose of this Step is to, in effect, divide the clientSpaceTree into eight different parts containing an approximately even division of the recent URL requests.

Step 642 then tests for the occurrence of two conditions: first, that such a set of eight organization nodes was found in step 640, indicating that a significant number of monitored web pages have been sent to at least eight different network organizations; and, second, that each of those eight organization nodes has above a threshold ratio of probMsgs relative msgSent in its corresponding subtree probMsg/msgSent data structure 310A, shown in FIG. 17, indicating that a high ratio of Web pages sent have resulted in problem messages in all parts of the network to which the server has recently sent such pages. If both of these conditions are met it indicates there is a relatively serious performance problem with the capacity of the server to respond to requests it is receiving. This could result from either a demand which exceeds the intended capacity of the server, or a malfunction which is causing the server to perform at less than its intended capacity. In either case, if there is such a generalized server problem, Steps 644–668 are performed.

Step 644 places a problemNode indication in the system node of the clientSpaceTree so that problem messages generated by Step 470 of FIG. 23 will be sent in response to subseqent URL requests from clients all across the Internet. Next Step 646 places a versionType indication with a value equal lightDuringProblem in the root of the clientSpaceTree, so Steps 514 through 522 of the selectAndRequestAppropriateBackendResponse function shown in FIG. 24 will seek to send out light versions of all Web page's requested. Next, the Step 648 sends out an e-mail and pager message to the human operators of the servant system. This Step includes Substeps 650 and 652. Substep 650 generates a statement that a general performance problem has been detected and it lists the probMsg/msgSent ratio and increasedOnloadTimes of the system node of the clientSpaceTree. Substep 652 tests to see if the requestsAnswered values for any of the backend servers is substantially below their intended capacity, indicating that such a server might be having a hardware problem. If this is the case, Step 652 generates an indication in the message which is sent to the system's human operators that the problem appears to be a hardware problem and lists the requestsAnswered rates for each backend server.

Next Step 652 tests if the increasedOnloadTime at the system node of the clientSpaceTree has remained at more than a high threshold value for longer than a threshold period of time since Step 646 has set versionType to lightDuringProblem in a previous call to the function of FIG. 32. If so, it indicates that switching to sending lighter versions of Web pages has not been sufficient to reduce the problem. If this is the case, Steps 556 through 668 are executed.

Step 656 tests if a throttleOnGeneralProblem variable has been set by the operators of the system. If so, Step 658 causes the spreader computer 104 to throttle responses to low priority requests. In the embodiment of the invention shown, this throttling decreases the rate at which the spreader computer responds to requests coming from clients who, according to their purchaseHistory 324 data structure, shown in FIG. 17, have not been significant purchasers of products from the server's Web site.

If the test of Step 656 has not been met, Step 660 tests if the operators of the server system have set an increaseBackendServersOnGeneralProblem variable. If so, Step 662 automatically negotiates to see if the server can rent capacity from other backend servers available on the Internet. If so, Step 666 copies files from one of the backend servers 106 of the system 102 to such extra backend servers; enters the addresses of those files on such new backend servers into the serverSpaceTree shown in FIGS. 18 and 19; and starts spreading URL requests to such extra backend servers by use of the selectAndRequestAppropriateBackendResponse function shown in FIG. 24.

If neither the tests contained in Steps 656 or 660 is met, Step 666 tests if a variable increasedThrottleOnGeneralProblem has been set by the operators of the server system 102. If this is the case, a Step 668 automatically negotiates to see if extra throttle capacity can be purchased on the current server system so as to improve the system's performance. This option would be used when the system 102 is operating on a larger host site shared with other hosted web sites and the hosting system provides variable bandwidth to the Internet to such hosted web sites as a function of the amount such hosted sites pay at any given time.

If the tests on Step 642 fails to find that a high subtree probMsg/msgSent ratio is spread throughout that portion of the Internet to which the server is sending monitored data objects, then Steps 670 and 672 clear the problemNode indication from the root of the clientSpaceTree and clear all versionType=lightDuringProblem indications from that tree. These two Steps have the effect of undoing the operation performed by Steps 644 and 646 which occur when a generalized server problem is detected.

Once all of these Steps have been completed, the determineIfThereIsAGeneralServerProblem function is complete and the call to that function in Step 632 of FIG. 31 returns. At this time Step 631 of the determineIfServerHasProblem function calls the determineIfThereIsALocalizedServerProblem function shown in FIG. 33.

FIG. 33 shows that when determineIfThereIsALocalizedServerProblem is called, Step 680 separately calculates the average for each performance statistics contained in the statistics set 354 shown in FIG. 19 first for all backendServer nodes and then for all hardDisk nodes. Once this is done, a Loop 681 is performed for each of the backendServer and hardDisk nodes. For each such node processed, a Sub-loop 682 causes Steps 684–696 to be performed for each performance statistic of that node's statistic set.

Step 684 tests if there is sufficient data to indicate the current node's statistic is substantially worse than the average calculated for the same statistic across the corresponding backendServer or hardDisk level of the serverSpaceTree in Step 680. If so, it indicates a problem represented by the statistic appears to be concentrated in the backend server or hard disk represented by the current node, and Steps 686 through 690 are performed. Step 686 tests if the statistic was not previously marked with a problemForNode indication. If so, Step 688 marks the statistic with such a problemForNode indication and Step 690 sends a notification to the operators of the server system through e-mail specifying the node, the statistic, the average value of the statistic for the node's corresponding backendserver or hardDisk level calculated in Step 680, and the value of the statistic for the current node.

If the test in Step 684 fails to find sufficient indication that the current statistic of loop 682 has a substantially worse than average value, Step 692 tests if the current statistic is marked with a problemForNode indication. If so, the node is inappropriately marked and Step 694 removes the problemForNode indication and Step 696 sends a notification to the operator of the server system specifying that it is not clear the statistic is still a problem for the node.

Returning again to FIG. 20, the mainSpreaderLoop also includes Steps 415 and 416 which test if the time since the last call to the distributionUpdate function 700, shown in FIG. 34, exceeds a threshold time, in which case it calls that function.

FIG. 34 shows that the distributionUpdate function performs a loop 702 for each file node 752, shown in FIG. 18, of the serverSpaceTree. For such file node, a 703 loop is performed for each time distribution 374, shown in FIG. 19, associated with that node. As shown in FIG. 19, this includes formTimeDistributions 376 for form-related script files, onloadTimeDistributions 377 for documents and image files, UnloadTimeDistributions 378 for page documents, and codeTimeDistributions 380 for document files containing instructions for measuring the time required to execute segments of code. For each such time distribution a Step 704 tests if that distribution is stale, i.e., that it does not have enough sufficiently recent data to be valid. How much data is required and how recent such data has to be to trigger the test in Step 704 can be separately varied by the operators of the server for each different eventType. If the time distribution is stale, Step 706 sets the updateTimeDistributions data structure 782 shown in FIG. 19 to indicate that the file node is to monitor eventTypes necessary to update the stale time distribution.

FIGS. 35–38 represent an alternate embodiment of the invention. This embodiment is designed to improve the performance of a server system when responding to requests from different parts of the Internet.

Figure 35:
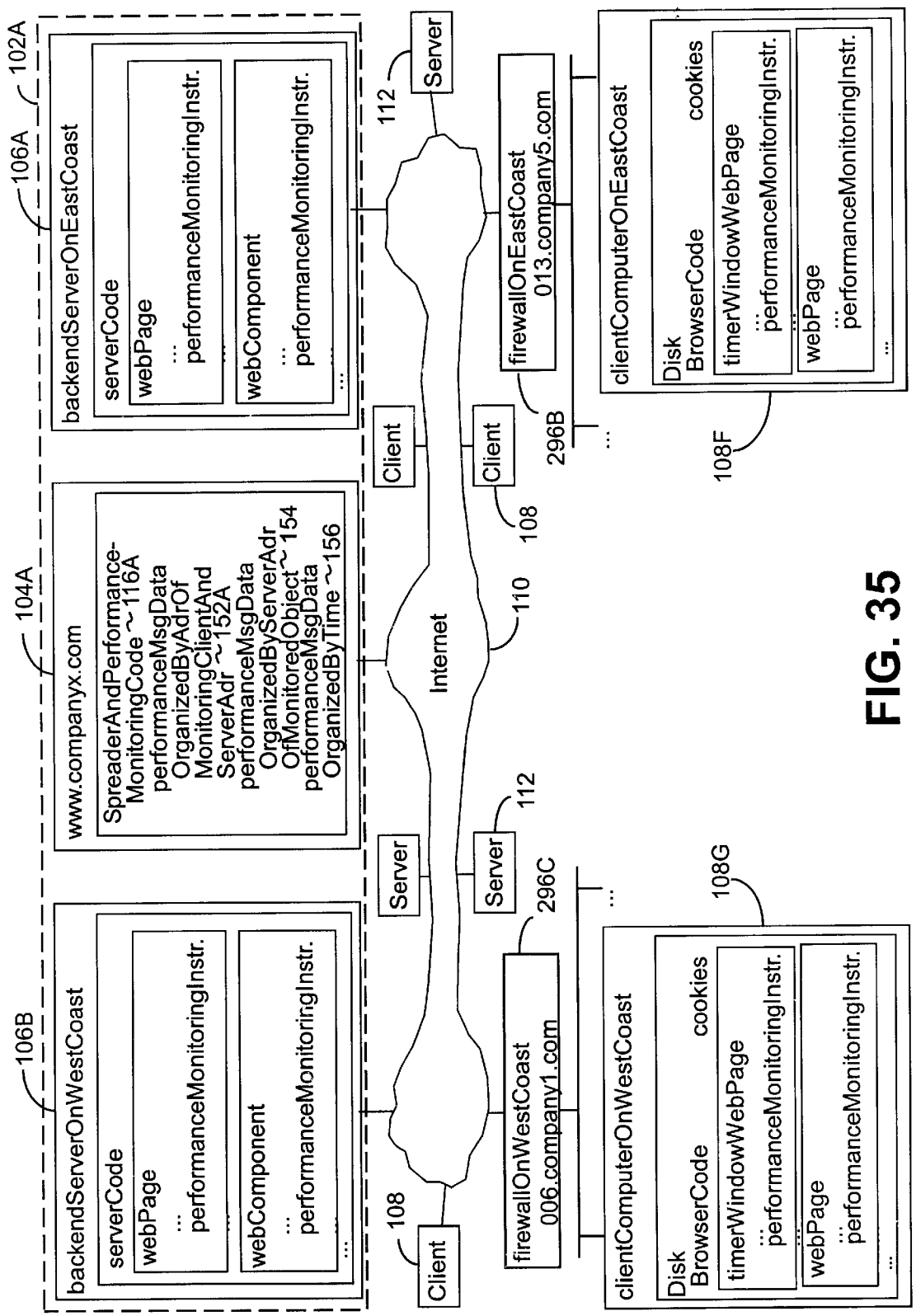
FIG. 35 is a graphical representation of an alternate embodiment of the invention which spreads responses to URL requests between backend servers based on the relative performance provided by each backend server to the network entity through which an individual URL request has come.

FIG. 35 illustrates a server system 102A which is identical to that described above except that its backend servers 106A and 106B are connected to the Internet 110 at distant points, such as on the East and West Coast, respectively, of the United States. Other than their locations, the backend servers of the system 102A are substantially,, identical to the backend servers described above. The system's spreader computer 104A, however, contains modifications to support geographic spreading. This include a slight modifications to the spreader computer's code 116A and to its clientSpaceTree 152A, which is its data structure that organizes performance message data by client address.

The purpose of these modifications is to enable the spreader computer 104A to select which backend server should handle a URL request from a given client based on which of those backend servers has had the best download times to the network entity through which the client connects to the Internet. In the example of FIG. 35 when the server receives URL requests from a client 108G connected to Internet through a network entity 296C located on the west coast, the spreader 104 relays those requests to the backend spreader 106B, also located on the West Coast, which is assumed to have the fastest past download times to the client's network entity 296C. Similarly it will tend to have the backend server 106A located on the east cost handle URL requests from a client 108F which is connected to the Internet through a network entity 296B located on the east coast.

Currently the time required to communicate over the Internet between many geographical locations, such as the east and west coast of the United States, is often so small that the geographical spreading of server 104A will be of little use. But if the system's backend servers are located in parts of the Internet which don't have sufficient communications capacity between them to virtually instantly handle the traffic between them, this feature will be of benefit. Also, as more users of the Internet connect to it with higher bandwidth links and as more and more Internet usage involves the communication of video, the traffic on the Internet will increase greatly, raising the likelihood of delays between different parts Internet. As this happens, geographic spreading will become more valuable.

FIG. 36 is a partial schematic representation of the clientSpaceTree 152A in the spreader computer 104A shown in FIG. 35. This clientSpaceTree is identical to that shown in FIG. 17 except that the increasedOnloadTime data structure 312 shown in FIG. 17 for each network Entity node is replaced by an increasedOnloadTime list 312B which includes a separate increasedOnloadTime value 710 for each backend servers of the system 102A. This enables the spreader computer 104A to know, for each network entity, which of its backend servers currently has the best average onload times to that network entity.

FIG. 37 is a partial view of the modified version of the selectAndRequestAppropriateBackendResponse function which is used with the server 102A. This function is identical to that shown in FIG. 24 except that it replaces the Step 528 shown in FIG. 24 with Steps 714–724. It uses these Steps instead of Step 528 of FIG. 24 to select which of the copyURL's selected by Steps 524–526, shown in FIG. 24, is to be sent out in response to the URL request with which selectAndRequestAppropriateBackendResponse has been called.

Step 714 tests for two conditions: first, that the URL request was for a page; and, second, that network Entity node corresponding to the client which sent the URL request has a valid increasedOnloadTime 710, shown in FIG. 34, for each backend servers having a copyURL in the currently active copyURL lists created by Steps 524–526 shown in FIG. 24. If both these conditions are met, it means the server does not know which is the best backend server to respond to the current URL request. In this case, Steps 716 and 718 are performed.

Step 716 randomly selects one of the copyURL's whose corresponding backend server does not have a valid increasedOnloadTime 710. Then Step 718 sets a CGI script to set the page's pageCookie to have a zero pageOnload thresholdTime. This is done so data can be collected regarding all pageOnload times, including those not associated with problems, for purposes of updating the increasedOnloadTime 710 associated with the selected backend server. Step 718 also ensures that a backendServerCookie will be sent with the requested page indicating the identity of the backend server which sent the page and indicating that the backend server's increasedOnloadTime 710 is to be updated in response to the resulting performance message.

If the test of Step 714 finds that all of the copyURL's in the currently active copyURL lists created by Steps 524 through 526 shown in FIG. 24 do have a valid increasedOnloadTime for each of their associated backend servers, Step 720 causes Step 722 and 724 to be performed. Steps 724 selects that one of the remaining copyURL's whose backend server has the lowest combination of increasedOnloadTimes both in its networkEntity node, as shown in FIG. 34, and in the statistics set 354 associated with the selected copyURL's serverSpaceTree file node, show in FIG. 19. This should select the backend server most likely to provide the fastest download for the requested URL. Next Step 724 sets a script which causes a backendServerCookie to be sent with the page indicating the selected backend server to which the page is being sent and that the server's increasedOnloadTime need not be updated with any resulting performance message.

FIG. 38 indicates the changes to the handlePerformanceMsgForPage function 564A which is used with the geographical spreading embodiment of the present invention. This function is identical to the handlePerformanceMsgForPage fiinction 564 shown in FIGS. 27 except that the Step 578 shown in FIG. 27 has been replaced with a Step 578A and additional Steps 730 and 732 have been added.

Step 578A differs from Step 578 of FIG. 27 in that when it uses the difference between a performance message's pageonload time and the average of the page's onloadTimeDistribution to update increasedOnloadTime values in the networkEntity nodes of the clientSpaceTree, Step 578A uses the indication of which backend server downloaded the performance message's corresponding page to determine which of the increasedOnloadTime 710, shown in FIG. 36, should be updated. The system determines which backend server downloaded the page from the backendServerCookie sent with the performance message.

Step 578A updates the increasedOnloadTime values 710 associated with a backend server's networkEntity nodes as part of the updating of increasedOnloadTimes and onloadTimeDistributions caused from time to time in response to operation of the distributionUpdate function shown in FIG. 34. Steps 730 and 732, on the other hand, update a backend server's increasedOnloadTime 710 in response to performance messages associated generated in response to a detection by Step 714 of FIG. 37, described above, that the given increasedOnloadTime did not have enough data to be valid.

Step 730 tests to see if the backendServerCookie which accompanies a performance message for which handlePerformanceMsgForPage has been called indicate its backend server's increasedOnloadTime 710 is to be updated. This would be the case if the test of Step 714 of FIG. 37 was met when the performance message's page was sent out by the server. If the backendServerCookie contains such an indication, Step 732 finds the difference between the performance message's pageOnload timeDifference and the average of the page's onloadTimeDistribution and uses that difference to update the backend server's increasedOnloadTime 710 in the clientSpaceTree networkEntity node corresponding to the client from which the performance message came.

The combination of the changes shown in FIGS. 36–38 tend to cause the clientSpaceTree 152A in the spreader computer 104A to include valid IncreasedOnloadTime values for each backend server in the networkEntity node for most network entities from which it received a reasonable number of URL requests. As a result it tends to cause the backend server which can most promptly serve URL requests from a given client to handle such requests.

It should be understood that the foregoing description and drawings are given merely to explain and illustrate the invention and that the invention is not limited thereto, except insofar as the interpretation of the appended claims are so limited. Those skilled in the art who have the disclosure before them will be able to make modifications and variations therein without departing from the scope of the invention.

For example, the functions described in the claims below, like virtually all computer functions, can be performed by many different progranmming and data structures, and by using different organization and sequencing. This is because programming is an extremely flexible art form in which a given idea of any complexity, once understood by those skilled in the art, can be manifested in a virtually unlimited number of ways.

Furthermore, it should be understood that the invention of the present application, as broadly claimed, is not limited to use with any one type of operating system, computer hardware, or network protocol. Furthermore, many of the functions which are shown being performed in software in the specification could be performed in hardware in other embodiments.

It should be understood that other embodiments of the invention might not use timeWindows at all. Web documents could send separate performance messages to servers for both the start time and end times associated with events, and the server could calculate the time difference between them.

It should be understood that in future embodiments of the invention standard browser software used on client computer might provide more support for the monitoring and reporting of performance on individual client computers. In this case performance monitoring instructions sent to the client computer in conjunction with the download of data object might involve only the sending of messages to control and direct performance monitoring executed by such browser code. In alternate embodiments of the inventions, downloaded plug-in software could be used to modify browser so as to provide more support for such monitoring.

Some browser currently make it possible to determine the type of communication link a client is using to connect to the Internet. The download performance monitoring of this system also makes it possible to estimate such information even when it cannot be directly ascertained from a client's browswer. Once a given client's bandwidth is ascertained, it can be used to more accurately determine the length of time for the downloading of a given file which represents a performance problem, and it can calculate different performance statistics for clients with different speed communication links so it can more accurately calculates the increases in onload time which they are likely to suffer when a given problem is occurring.

Those skilled in Web technology will understand that there are other ways in which the server could communicate performance monitoring instructions to client computers. For example, a Web page, such as a timerWindow page, could have a frame window which is kept open for communication from the server and the server could send instructions to alter a client's performance monitoring through such an open communication link without requiring subsequent URL requests from that client.

Most of the discussion above focuses on a monitoring the performance of clients connected to a server over the Internet. It should be understood, however, that many aspects of the invention are equally applicable to monitoring similar performance occurring on clients and server all of which connected to a local area network (LAN) or wide area network (WAN).

It should be understood that in some embodiments of the invention the server system would merely record and chart the performance monitoring information it derives. In other embodiments of the invention rules other than those described above would be used to determine what responses were automatically made to various performance monitoring information. In fact, it would be desirable to have a user-editable rule base control the system's response to various types of performance monitoring information so the system's response could be tailored by its operators to fit there particular needs and their particular experience.

It should also be understood that it is not necessary that the spreader computer be the computer of the server system which receives performance messages from clients. Similarly it should be understood that although the server 102 shown in FIG. 1 is comprised of a plurality of computers, the present invention can be used with servers comprised of just one computer.

In other embodiments of the geographical spreading system shown in FIGS. 35–38, once a decision is made as to which backend server can most quickly handle communications with a given client computer, the selected backend server could send the client versions of Web pages containing URL references to the selected backend server itself, preventing the need to send further URL requests for subsequent pages from the system's web site to the system's spreader computer. This would further reduce the amount of data which would have to be communicated far across the network.

In the embodiment of the invention described above the time required for the downloading of objects is measured from when the object is requested on the client to when it has been downloaded to the client. In other embodiments of the invention, when communication latencies between the server and client are very low, such as below one hundredth of a second, it would be possible for the server to determine the time difference between its system clock and that on the server with a fair degree of accuracy. Once this is done, the system would be able to determine not only the time difference between two events on the client, but also the time difference between an event on the server and an event on the client, such as the length of time from when a client requested a URL and when the server receives that request, or the amount of time between when the server started to send out a data object and the time when that object is completely downloaded to the client.

It should also be understood that the invention is not limited to use with Web pages and Web documents. In other embodiments it could be used to measure the performance of other types of network media, such as video or audio media.

The embodiment of the invention above describes sequential component onload time monitoring. In other embodiments of the invention it would also be possible to keep performance statistics on the onload times associated with the components of a page when there was no effort to enforce such sequential monitoring.

In the description above, the only versionType described is lightDuringProblem. It should be understood that other version types could be used, such as text only or high bandwidth versionTypes.

It should be understood that although it is not mentioned above, the clientSpaceTree, serverSpaceTree, and msgHistory can be cached. This enables the system to keep extensive records on the performance it has monitored without requiring a prohibitively large random access memory.

In FIG. 2 the file structures shown on both backend servers are identical. In IP spreading systems it is common for each backend server to include an identical copy of a Web site. It should be appreciated, however, that this is not necessary and the description of the invention above is designed to work with a server system in which different backend servers have different files. In fact, the component monitoring described above is most valuable in a system in which different backend servers have different files, because in that case a performance problem associated with the download time of a composite page might actually result from problems with the download of component objects from a different backend server.

Finally, it should be appreciated that the invention described above is applicable to systems in which individual computers can act both as clients and servers.

I claim:

1. A computerized method executed on a Web server having one or more computers connected to each other and to client computers by a computer network, said method comprising:

receiving over said network URL requests from individual client computers requesting the transmission by said server to said client computers of individual data objects identified by URL;

responding to the receipt of each of individual URL requests by transmitting information including one or more data objects corresponding to the URL contained in said request to the given client computer from which the request came, with the transmitted information transmitted in response to some such URL requests including performance monitoring instructions which instruct the given client computer to send to the server a performance message indicating the length of time required on the given client computer for the performance of an act associated with one or more of said transmitted data objects; and receiving said performance messages transmitted by individual client computers to said server in response to such performance monitoring instructions;

wherein said performance monitoring instructions are transmitted in conjunction with a composite data object which include URLs to one or more component data objects and instruct a client computer to send a performance monitoring message indicating the length of time required for downloading to the client computer from a server of one or more of said component data objects.

2. A computerized method executed on a Web server having one or more computers connected to each other and to client computers by a computer network, said method comprising:

receiving over said network URL requests from individual client computers requesting the transmission by said server to said client computers of individual data objects identified by URL;

responding to the receipt of each of individual URL requests by transmitting information including one or more data objects corresponding to the URL contained in said request to the given client computer from which the request came, with the transmitted information transmitted in response to some such URL requests including performance monitoring instructions which instruct the given client computer to send to the server a performance message indicating the length of time required on the given client computer for the performance of an act associated with one or more of said transmitted data objects; and receiving said performance messages transmitted by individual client computers to said server in response to such performance monitoring instructions;

wherein said performance monitoring instructions instruct a client computer to send a performance message indicating the length of time required on a client computer for performance of a given portion of computer programming included in one or more of said data objects transmitted to said client computer.

3. A computerized method executed on a Web server having one or more computers connected to each other and to client computers by a computer network, said method comprising:

receiving over said network URL requests from individual client computers requesting the transmission by said server to said client computers of individual data objects identified by URL;

responding to the receipt of each of individual URL requests by transmitting information including one or more data objects corresponding to the URL contained in said request to the given client computer from which the request came, with the transmitted information transmitted in response to some such URL requests including performance monitoring instructions which instruct the given client computer to send to the server a performance message indicating the length of time required on the given client computer for the performance of an act associated with one or more of said transmitted data objects; and receiving said performance messages transmitted by individual client computers to said server in response to such performance monitoring instructions;

wherein said performance monitoring instructions instruct:

a first data object downloaded on to said client computer to communicate to a second data object when a first event occurs in said first data object on said client computer; and a second data object downloaded on to said client computer to send a performance message indicating the difference in time between the occurrence of said first event and the occurrence of a second event occurring in a data object other than said first data object which has been downloaded onto said client computer.

4. A computerized method executed on a Web server having one or more computers connected to each other and to client computers by a computer network, said method comprising:

receiving over said network URL requests from individual client computers requesting the transmission by said server to said client computers of individual data objects identified by URL;

responding to the receipt of each of individual URL requests by transmitting information including one or more data objects corresponding to the URL contained in said request to the given client computer from which the request came, with the transmitted information transmitted in response to some such URL requests including performance monitoring instructions which instruct the given client computer to send to the server a performance message indicating the length of time required on the given client computer for the performance of an act associated with one or more of said transmitted data objects; and receiving said performance messages transmitted by individual client computers to said server in response to such performance monitoring instructions;

wherein said performance monitoring instructions instruct a client computer to send a performance message indicating the time, measured on the client computer, to perform a transaction which includes the uploading of user input from the client computer to said server and the downloading of information, in response to said upload, from the server to the client computer.

5. A computerized method as in claim 4 wherein said transaction includes the uploading of an HTML form including user input and the downloading of information from the server in response to said upload.

6. A computerized method executed on a Web server having one or more computers connected to each other and to client computers by a computer network, said method comprising:

receiving over said network URL requests from individual client computers requesting the transmission by said server to said client computers of individual data objects identified by URL;

responding to the receipt of each of individual URL requests by transmitting information including one or more data objects corresponding to the URL contained in said request to the given client computer from which the request came, with the transmitted information transmitted in response to some such URL requests including performance monitoring instructions which instruct the given client computer to send to the server a performance message indicating the length of time required on the given client computer for the performance of an act associated with one or more of said transmitted data objects; and receiving said performance messages transmitted by individual client computers to said server in response to such performance monitoring instructions;

wherein said performance monitoring instructions instruct a client computer to send a performance message indicating when a user of the client computer aborts the downloading of a page and the length of time the downloading of said page had taken prior to said abort.

7. A computerized method executed on a Web server having one or more computers connected to each other and to client computers by a computer network, said method comprising:

receiving over said network URL requests from individual client computers requesting the transmission by said server to said client computers of individual data objects identified by URL;

responding to the receipt of each of individual URL requests by transmitting information including one or more data objects corresponding to the URL contained in said request to the given client computer from which the request came, with the transmitted information transmitted in response to some such URL requests including performance monitoring instructions which instruct the given client computer to send to the server a performance message indicating the length of time required on the given client computer for the performance of an act associated with one or more of said transmitted data objects; and receiving said performance messages transmitted by individual client computers to said server in response to such performance monitoring instructions;

wherein:

said computer network has an end-system address space including the addresses of all of the client computers on said network;

each performance message sent by a client computer to said server includes a source address identifying the end-system address of the client computer from which said performance message originated; and at least some of the performance messages received by said server are problem messages which indicate that the length of time required for the downloading of data objects to a client computer took more than a threshold amount of time; and said method further includes creating a problem distribution representation, which indicates how source addresses of the problem messages received by the server are distributed in said end-system address space by organizing information from said problem messages by said client source addresses.

8. A computerized method as in claim 7 including varying how said server responds to the receipt of a set of performance messages as a function of how said problem distribution representation indicates the source addresses of problem messages are distributed across said end-system address space.

9. A computerized method as in claim 8 wherein said varying the response the server makes includes:

generating a message distribution representation which indicates the distribution of end-system addresses of client computers to which data objects monitored by performance monitoring instructions have been sent; and using both the problem distribution representation and the message distribution representation in generating an indication of whether a performance problem appears to be in the server or in a portion of the network external to said server.

10. A computerized method as in claim 8 wherein said varying the response the server makes includes:

finding what problem messages have client source addresses associated with individual external network entity; and determining whether or not to generate an indication that there is a performance problem in a given network entity as a function of the number of problem messages received from clients having addresses associated with the given network entity.

11. A computerized method as in claim 10 wherein:

said external network entities include entities associated with Internet service providers; and said indication that there is a performance problem localized in a given network entity provides an indication that the performance problem is associated with a given Internet service provider.

12. A computerized method as in claim 10 wherein said generating an indication that there is a performance problem in said given network entity includes transmitting a message to client computers in the given network's sub-portion of the end-system address space that a performance problem is associated with said given network entity.

13. A computerized method as in claim 10 wherein said varying the response the server makes includes determining whether or not to respond to a set of problem messages as resulting from a problem associated with the given client computer which sent the set of problem message as a function of:

the number of problem messages whose source addresses are associated with multiple network entities;

the number of problem messages whose source addresses are associated with the network entity with which the given client computer's source address is associated; and the number of problem messages which have been sent from the given client computer.

14. A computerized method as in claim 13 wherein said varying the response the server makes includes responding to said determination that a given set of problem messages results from a problem associated with a given client computer by sending a message to the given client computer indicating that a performance problem appears to be associated with the client computer.

15. A computerized method as in claim 13 wherein said varying the response the server makes includes responding to a determination that a given set of problem message results from a problem associated with a given client computer by increasing the probability that computer programming will be sent to the given client computer to help determine the source of the problem on the client computer.

16. A computerized method as in claim 13 wherein said varying the response the server makes includes offering a user of a given client computer the choice of receiving versions of web pages from the server which contain fewer bits so they can be downloaded more rapidly.

17. A computerized method as in claim 8 wherein said varying the response the server makes includes generating an indication of whether or not a performance problem relates to server capacity as a function of the extent to which the ratio between the number of data objects which have been sent out and the number of problem messages which have been received is above a certain level throughout that part of the end-system address system to which data objects have been sent.

18. A computerized method as in claim 17 further including responding to said indication that the problem is a function of server capacity by decreasing the percent of URL requests from certain clients to which the server responds by sending data objects corresponding to requested URLs.

19. A computerized method as in claim 17 further including responding to said indication that the problem is a function of server capacity by sending a message to a human operator of said server indicating there appears to be a problem with the server.

20. A computerized method as in claim 17 further including responding to said indication that the problem is a function of server capacity by reducing the amount of data transmitted to client computers in response to given URL requests.

21. A computerized method as in claim 17 further including responding to said indication that the problem is a function of server capacity by increasing said server capacity.

22. A computerized method executed on a Web server having one or more computers connected to each other and to client computers by a computer network, said method comprising:

receiving over said network URL requests from individual client computers requesting the transmission by said server to said client computers of individual data objects identified by URL;

responding to the receipt of each of individual URL requests by transmitting information including one or more data objects corresponding to the URL contained in said request to the given client computer from which the request came, with the transmitted information transmitted in response to some such URL requests including performance monitoring instructions which instruct the given client computer to send to the server a performance message indicating the length of time required on the given client computer for the performance of an act associated with one or more of said transmitted data objects; and receiving said performance messages transmitted by individual client computers to said server in response to such performance monitoring instructions;

wherein:

said responding to the receipt of URL requests includes transmitting copies of different data objects in response to different URL requests, with each of said data objects having an associated server address which is an address within the address space of the server from which copies of the data object are transmitted to client computers;

said performance monitoring instructions instruct client computers to monitor the download time of data objects transmitted to client computers by sending to the server a problem message indicating when the time required for the downloading of a given one of such monitored data object exceeds a certain threshold duration and indicating the identity of the given data object; and said method further includes generating an indication of whether or not the server's performance problem appears to be localized within a sub-portion of the server's address space as a function of the degree to which the distribution of said server addresses of monitored data objects for which problem messages are generated is concentrated within a certain portion of said server's address space.

23. A computerized method as in claim 22:

wherein said generating an indication of whether or not the server's capacity problem appears to be localized includes indicating the given portion of the server's address space within which the performance problem appears to localized; and further including responding to an indication that the problem is localized in a given portion of the server's address space by decreasing the number of times the server responds to a request for a given URL by sending a data object from said given address portion and increasing the number of times the server responds to such request by sending a data object from a different portion of the server's address space.

24. A computerized method executed on a Web server having one or more computers connected to each other and to client computers by a computer network, said method comprising:

receiving over said network URL requests from individual client computers requesting the transmission by said server to said client computers of individual data objects identified by URL;

responding to the receipt of each of individual URL requests by transmitting information including one or more data objects corresponding to the URL contained in said request to the given client computer from which the request came, with the transmitted information transmitted in response to some such URL requests including performance monitoring instructions which instruct the given client computer to send to the server a performance message indicating the length of time required on the given client computer for the performance of an act associated with one or more of said transmitted data objects; and receiving said performance messages transmitted by individual client computers to said server in response to such performance monitoring instructions;

wherein:

said data objects transmitted by said server in response to URL requests include composite data objects, the display of which require the downloading of component data objects referred to by URL within said composite data objects; and said performance monitoring instructions include composite monitoring instructions which cause client computers to send a problem message to the server when the download time of a composite data object exceed a certain threshold and component monitoring instructions which cause client computers to send a problem message to the server when the download time of a component data object exceed a certain threshold; and said method further includes responding to a distribution of problem messages which indicate there is a performance problem associated with a given composite data object by increasing the number of client computers which receive component monitoring instructions for component data objects of the composite data object which appears to have the performance problem.

25. A computerized method executed on a Web server having one or more computers connected to each other and to client computers by a computer network, said method comprising:

receiving over said network URL requests from individual client computers requesting the transmission by said server to said client computers of individual data objects identified by URL;

responding to the receipt of each of individual URL requests by transmitting information including one or more data objects corresponding to the URL contained in said request to the given client computer from which the request came, with the transmitted information transmitted in response to some such URL requests including performance monitoring instructions which instruct the given client computer to send to the server a performance message indicating the length of time required on the given client computer for the performance of an act associated with one or more of said transmitted data objects; and receiving said performance messages transmitted by individual client computers to said server in response to such performance monitoring instructions;

wherein the responding to URL requests includes transmitting a given type of performance monitoring instructions in response to only a sampling of requests for a given URL.

26. A computerized method executed on a Web server having one or more computers connected to each other and to client computers by a computer network, said method comprising:

receiving over said network URL requests from individual client computers requesting the transmission by said server to said client computers of individual data objects identified by URL;

responding to the receipt of each of individual URL requests by transmitting information including one or more data objects corresponding to the URL contained in said request to the given client computer from which the request came, with the transmitted information transmitted in response to some such URL requests including performance monitoring instructions which instruct the given client computer to send to the server a performance message indicating the length of time required on the given client computer for the performance of an act associated with one or more of said transmitted data objects; and receiving said performance messages transmitted by individual client computers to said server in response to such performance monitoring instructions;

wherein:

said performance messages sent by client computers to the server include indications of the length of time required for the downloading of data objects from the server to client computers; and said method further includes sending to client computers an indication of the estimated time required for future downloading of data objects from the server to client computers, based on said download time indications contained in said performance messages received by said server.

27. A computerized method executed on a Web server having one or more computers connected to each other and to client computers by a computer network, said method comprising:

receiving over said network URL requests from individual client computers requesting the transmission by said server to said client computers of individual data objects identified by URL;

responding to the receipt of each of individual URL requests by transmitting information including one or more data objects corresponding to the URL contained in said request to the given client computer from which the request came, with the transmitted information transmitted in response to some such URL requests including performance monitoring instructions which instruct the given client computer to send to the server a performance message indicating the length of time required on the given client computer for the performance of an act associated with one or more of said transmitted data objects;

receiving said performance messages transmitted by individual client computers to said server in response to such performance monitoring instructions; and responding to the receipt of performance messages indicating a problem by causing said responding to the receipt of URL requests to alter the information it transmits to a client computer in response to a request for a given URL.

28. A computerized method as in claim 27 wherein said altering of information transmitted in response to a request for a given URL includes altering the performance monitoring instructions which are transmitted in response to such a request.

29. A computerized method as in claim 27 wherein said altering of information transmitted in response to a request for a given URL includes altering the size of data objects which are transmitted in response to such a request.

30. A computerized method executed on a Web server having one or more computers connected to each other and to client computers by a computer network, said method comprising:

receiving over said network URL requests from individual client computers requesting the transmission by said server to said client computers of individual data objects identified by URL;

responding to the receipt of each of individual URL requests by transmitting information including one or more data objects corresponding to the URL contained in said request to the given client computer from which the request came, with the transmitted information transmitted in response to some such URL requests including performance monitoring instructions which instruct the given client computer to send to the server a performance message indicating the length of time required on the given client computer for the performance of an act associated with one or more of said transmitted data objects; and receiving said performance messages transmitted by individual client computers to said server in response to such performance monitoring instructions;

wherein;

said server includes a plurality of server computers each having a different address on said computer network; and said method further includes responding to the receipt of a set of performance messages which indicate a problem by causing said responding to the receipt of URL requests to alter which of said server computers transmits a data object in response to a request for a given URL.

31. A computerized method as in claim 30 wherein:

said performance monitoring instructions instruct client computers to send to the server a problem message which identifies a given data object when the time required to download the data object to the client computer exceeds a threshold duration; and said altering which of said server computers transmits a data object in response to a request for a given URL includes selecting which of said server computers is to respond to a given URL request as a function of the different number of said problem messages which are generated in response to the downloading of data objects from each of said server computers.

32. A computerized method executed on a Web server having one or more computers connected to each other and to client computers by a computer network, said method comprising:

receiving over said network URL requests from individual client computers requesting the transmission by said server to said client computers of individual data objects identified by URL;

responding to the receipt of each of individual URL requests by transmitting information including one or more data objects corresponding to the URL contained in said request to the given client computer from which the request came, with the transmitted information transmitted in response to some such URL requests including performance monitoring instructions which instruct the given client computer to send to the server a performance message indicating the length of time required to download one or more of said transmitted data objects to the client computer;

receiving said performance messages transmitted by individual client computers to said server in response to such performance monitoring instructions; and responding to the receipt of performance messages from a client computer indicating that the length of time required for the downloading of data objects to the client computer took more than a threshold amount of time by causing said responding to the receipt of a URL request from that client computer to decrease the size of one or more data objects which are transmitted in response to such a request.

33. A computerized method as in claim 32 wherein said data objects include web pages, and said data objects of decreased size include Web pages which include less data to download.

34. A computerized method as in claim 33 wherein said data objects of decreased size include web pages which fewer or smaller images.

35. A computerized method for use in distributing data objects to client computers over a computer network, which method is executed on a server system having a plurality of server computers connected to and having individual addresses on said network, with at least one of said server computers being a spreader computer and a plurality of said server computers being backend server computers, said method comprising:

receiving, at the spreader computer, individual URL requests, each of which URL requests includes:
a destination address addressed to the spreader computer
a URL indicating which data object is to be transmitted in response to the request; and
a source address identifying the client computer to which the data object is to be sent;

responding, at the spreader computer, to a given URL request by sending a corresponding redirected request to a selected one of said backend server computers, which redirected-request contains the URL request's source address and an indication of a data object, corresponding to the URL request's requested URL, which is to be sent to said source address; and responding, at each backend server, to the receipt of a redirected request by transmitting the data object identified by the redirected request to the source address contained in the redirected request;

wherein the sending of a given redirected URL request includes selecting which of said plurality of backend server computers to redirect the given URL request to as a function of the network entity represented by the source address of the URL request.

36. A computerized method as in claim 35 wherein:

a plurality of said backend server computers are distributed at substantially different geographic locations; and said sending of a given redirected URL request tends to send a given URL request to one of said geographically differently located backend server computers as a function of the geographic location of the network entity represented by the given URL request's source address relative to the different geographic locations of said differently located backend server computers.

37. A computerized method for use in distributing data objects to client computers over a computer network, which method is executed on a server system having a plurality of server computers connected to and having individual addresses on said network, with at least one of said server computers being a spreader computer and a plurality of said server computers being backend server computers, said method comprising:

receiving, at the spreader computer, individual URL requests, each of which URL requests includes:
a destination address addressed to the spreader computer
a URL indicating which data object is to be transmitted in response to the request; and
a source address identifying the client computer to which the data object is to be sent;

responding, at the spreader computer, to a given URL request by sending a corresponding redirected request to a selected one of said backend server computers, which redirected request contains the URL request's source address and an indication of a data object, corresponding to the URL request's requested URL, which is to be sent to said source address; and responding, at each backend server, to the receipt of a redirected request by transmitting the data object identified by the redirected request to the source address contained in the redirected request;

wherein the sending of a given redirected URL request includes selecting which of said plurality of backend server computers to redirect the given URL request to by accessing information associated with, but not included in, the source address of the URL request and selecting which backend server to redirect the given URL request to as a function of said accessed information.

38. A computerized method as in claim 35 wherein said accessed information associated with the source address of the URL request includes all or a part of a domain name.

39. A computerized method for use in distributing data objects to client computers over a computer network, which method is executed on a server system having a plurality of server computers connected to and having individual addresses on said network, with at least one of said server computers being a spreader computer and a plurality of said server computers being backend server computers, said method comprising:

receiving, at the spreader computer, individual URL requests, each of which URL requests includes:
   a destination address addressed to the spreader computer
   a URL indicating which data object is to be transmitted in response to the request; and
   a source address identifying the client computer to which the data object is to be sent;

responding, at the spreader computer, to a given URL request by sending a corresponding redirected request to a selected one of said backend server computers, which redirected request contains the URL request's source address and an indication of a data object, corresponding to the URL request's requested URL, which is to be sent to said source address; and responding, at each backend server, to the receipt of a redirected request by transmitting the data object identified by the redirected request to the source address contained in the redirected request;

wherein the sending of redirected URL requests includes selecting which of said plurality of backend server computers to redirect a given URL request to as a function of the source address of the URL request by doing the following:

redirecting at least some URL requests having source addresses from a given portion of the address space of the computer network to different ones of said backend server computers;

receiving in response to said redirected requests a set of performance messages from client computers located in the given network address portion indicating the time required to download data objects sent to client computers in said given network address portion from each of said different backend server computers; and redirecting at least some URL requests having source addresses from said given network address portion to said different backend server computers as a function of the relative download times to the given network address portion indicated for said different backend servers by said performance messages.

* * * * *